United States Patent
Kurosawa et al.

(10) Patent No.: US 10,401,615 B2
(45) Date of Patent: Sep. 3, 2019

(54) BEAM DUMP APPARATUS, LASER APPARATUS EQUIPPED WITH THE BEAM DUMP APPARATUS, AND EXTREME ULTRAVIOLET LIGHT GENERATING APPARATUS

(71) Applicant: Gigaphoton Inc., Tochigi (JP)

(72) Inventors: Yoshiaki Kurosawa, Oyama (JP); Takashi Suganuma, Oyama (JP)

(73) Assignee: Gigaphoton Inc., Tochigi (JP)

(*) Notice: Subject to any disclaimer, the term of this patent is extended or adjusted under 35 U.S.C. 154(b) by 0 days.

(21) Appl. No.: 15/642,745

(22) Filed: Jul. 6, 2017

(65) Prior Publication Data

US 2017/0299857 A1    Oct. 19, 2017

Related U.S. Application Data

(63) Continuation of application No. PCT/JP2015/055930, filed on Feb. 27, 2015.

(51) Int. Cl.
*G02B 26/02* (2006.01)
*H05G 2/00* (2006.01)
(Continued)

(52) U.S. Cl.
CPC .......... *G02B 26/023* (2013.01); *G02B 27/14* (2013.01); *G21K 1/06* (2013.01); *H01S 3/1003* (2013.01);
(Continued)

(58) Field of Classification Search
CPC ...... G02B 26/02; G02B 26/023; G02B 27/14; G21K 1/06; H01S 3/1003; H01S 3/2316; H01S 3/005; H02G 2/008
See application file for complete search history.

(56) References Cited

U.S. PATENT DOCUMENTS 4,704,030 A * 11/1987 Steen ............... B23K 26/03
                                                    356/121
4,778,263 A * 10/1988 Foltyn .................. G02B 5/285
                                                    359/580

(Continued)

FOREIGN PATENT DOCUMENTS

JP    H02-140501 U    11/1990
JP    H04-017992 A    1/1992
(Continued)

OTHER PUBLICATIONS

International Search Report issued in PCT/JP2015/055930; dated May 19, 2015.

(Continued)

*Primary Examiner* — Eliza W Osenbaugh-Stewart
(74) *Attorney, Agent, or Firm* — Studebaker & Brackett PC

(57) ABSTRACT

A beam dump apparatus may include: an attenuator module; a beam dump module; and a control unit. The attenuator module includes: a first beam splitter provided inclined with respect to the optical axis of a laser beam at a first angle; a second beam splitter provided inclined with respect to the optical axis at a second angle; a first beam dumper provided such that the laser beam from the first beam splitter enters thereinto; a second beam dumper provided such that the laser beam from the second beam splitter enters thereinto; and a first stage that causes the beam splitters to advance into and retreat from the optical path. The beam dump module includes: a mirror; a third beam dumper provided such that the laser beam from the mirror enters thereinto; and a second stage that causes the mirror to advance into and retreat from the optical path.

16 Claims, 23 Drawing Sheets

(51) Int. Cl.
  *G02B 27/14* (2006.01)
  *G21K 1/06* (2006.01)
  *H01S 3/23* (2006.01)
  *H01S 3/10* (2006.01)
  *H01S 3/00* (2006.01)

(52) U.S. Cl.
  CPC .......... *H01S 3/2316* (2013.01); *H05G 2/008* (2013.01); *H01S 3/005* (2013.01)

(56) References Cited

U.S. PATENT DOCUMENTS

| | | | |
|---|---|---|---|
| 2010/0220756 A1 | 9/2010 | Krzysztof et al. | |
| 2011/0242639 A1 | 10/2011 | Kleinert | |
| 2012/0305809 A1* | 12/2012 | Moriya | H05G 2/003 250/504 R |
| 2013/0107899 A1 | 5/2013 | Matsunaga et al. | |
| 2016/0236279 A1* | 8/2016 | Ashton | B22F 3/1055 |

FOREIGN PATENT DOCUMENTS

| | | |
|---|---|---|
| JP | H10-326931 A | 12/1998 |
| JP | 2000-261076 A | 9/2000 |
| JP | 2004-025293 A | 1/2004 |
| JP | 2004-173774 A | 6/2004 |
| JP | 2010-226096 A | 10/2010 |
| JP | 2013-012465 A | 1/2013 |
| JP | 2013-098239 A | 5/2013 |
| JP | 2013-524512 A | 6/2013 |
| JP | 2013-179330 A | 9/2013 |
| JP | 2014-221486 A | 11/2014 |

OTHER PUBLICATIONS

Written Opinion issued in PCT/JP2015/055930; dated May 19, 2015.
An Office Action; "Notification of Reasons for Refusal," issued by the Japanese Patent Office dated Dec. 4, 2018, which corresponds to Japanese Patent Application No. 2017-501807 and is related to U.S. Appl. No. 15/642,745; with English language translation.

* cited by examiner

BEAM DUMP APPARATUS, LASER APPARATUS EQUIPPED WITH THE BEAM DUMP APPARATUS, AND EXTREME ULTRAVIOLET LIGHT GENERATING APPARATUS

CROSS REFERENCE TO RELATED APPLICATIONS

The present application is a Continuation application of International Application No. PCT/JP2015/055930 filed on Feb. 27, 2015. The content of the application is incorporated herein by reference in its entirety.

BACKGROUND

1. Technical Field

The present disclosure is related to a beam dump apparatus, a laser apparatus equipped with the beam dump apparatus, and an extreme ultraviolet (EUV) light generating apparatus.

2. Related Art

Recently, as semiconductor processes have become finer, transfer patterns for use in photolithography of semiconductor processes have also rapidly become finer. In the next generation, microfabrication at 70 nm to 45 nm, and further, microfabrication at 32 nm or less will be in demand. In order to meet this demand for microfabrication at 32 nm or less, there is expectation for development of an exposure apparatus in which an extreme ultraviolet (EUV) light generating apparatus that generates extreme ultraviolet (EUV) light having a wavelength of approximately 13 nm is combined with a reduced projection reflective optic system.

Three types of EUV light generating apparatuses have been proposed. The three types are: an LPP (Laser Produced Plasma) type apparatus that employs plasma which is generated by irradiating a laser beam onto a target substance; a DPP (Discharge Produced Plasma) type apparatus that employs plasma which is generated by electrical discharge, and an SR (Synchrotron Radiation) type apparatus that employs synchrotron orbital radiation.

RELATED ART DOCUMENTS

Patent Documents

[Patent Document 1]
Japanese Unexamined Utility Model Publication No. H2-140501
[Patent Document 2]
Japanese Unexamined Patent Publication No. H4-17992
[Patent Document 3]
Japanese Unexamined Patent Publication No. H10-326931
[Patent Document 4]
Japanese Unexamined Patent Publication No. 2004-25293
[Patent Document 5]
Japanese Unexamined Patent Publication No. 2013-12465
[Patent Document 6]
Japanese Unexamined Patent Publication No. 2013-179330

SUMMARY

A beam dump apparatus according to one aspect of the present disclosure may include:
an attenuator module;
a beam dump module; and
a laser control unit configured to control the attenuator module and the beam dump module;
the attenuator module including:
a first beam splitter provided inclined with respect to the optical axis of a laser beam at a first angle;
a second beam splitter provided inclined with respect to the optical axis at a second angle, of which the absolute value is equal to that of the first angle and of which the sign is opposite that of the first angle;
a first beam dumper provided such that the laser beam which is reflected by the first beam splitter enters thereinto;
a second beam dumper provided such that the laser beam which is reflected by the second beam splitter enters thereinto; and
a first stage that causes the first and second beam splitters to advance into and retreat from the optical path of the laser beam;
the beam dump module including:
a mirror provided inclined with respect to the optical axis of the laser beam;
a third beam dumper provided such that the laser beam which is reflected by the mirror enters thereinto; and
a second stage that causes the mirror to advance into and retreat from the optical path; and
the laser control unit may control the first stage to selectively cause the first and second beam splitters to advance into or retreat from the optical path, and may control the second stage to selectively cause the mirror to advance into or retreat from the optical path.

A laser apparatus according to another aspect of the present disclosure may include:
a master oscillator configured to output a laser beam;
an amplifier configured to amplify the laser beam; and
the aforementioned beam dump apparatus, provided along the optical path of the laser beam.

An extreme ultraviolet light generating apparatus according to still another aspect of the present disclosure is an extreme ultraviolet light generating apparatus configured to generate extreme ultraviolet light by a target substance, which is supplied into a plasma generating region, being irradiated by a laser beam, and may include:
the aforementioned laser apparatus, which is configured to output the laser beam;
a chamber, within which the plasma generating region is set;
a light collecting optical system configured to collect the laser beam in the vicinity of the plasma generating region;
a target supply apparatus configured to supply the target substance in the vicinity of the plasma generating region; and
a light collecting mirror configured to collect extreme ultraviolet light emitted by plasma, which is generated by the target substance being irradiated by the laser beam.

BRIEF DESCRIPTION OF THE DRAWINGS

Embodiments of the present disclosure will be described below as examples, with reference to the attached drawings.

DETAILED DESCRIPTION OF THE PREFERRED EMBODIMENTS

Figure 1:
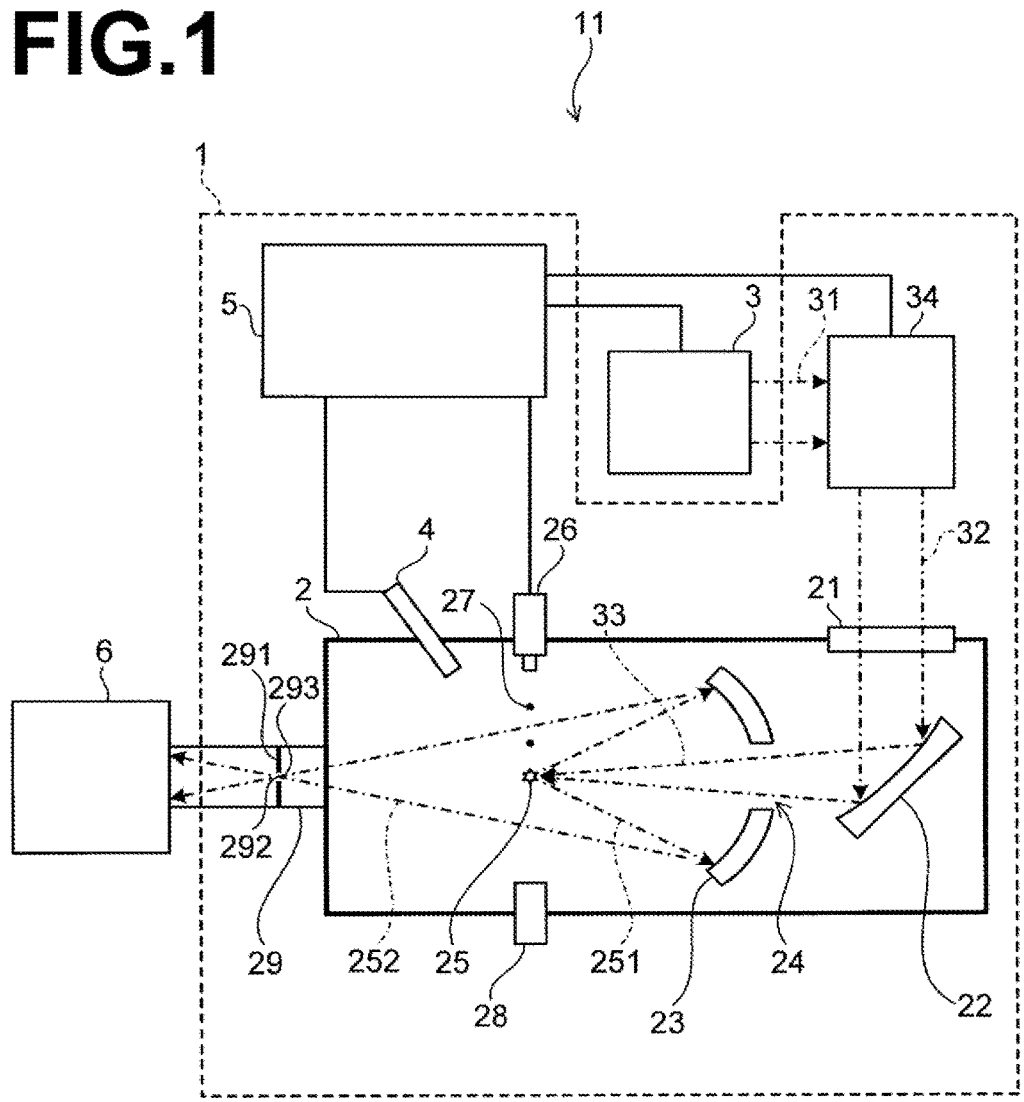
FIG. 1 is a diagram that schematically illustrates an example of the configuration of an exemplary EUV light generating system of the LPP type.

Contents
1. Overview
2. Terms
3. Overview of EUV Light Generating System
   3.1 Configuration
   3.2 Operation
4. EUV Light Generating System equipped with Beam Dump Apparatus: Comparative Example
   4.1 Configuration
   4.2 Operation
   4.3 Problem
5. First Embodiment
   5.1 Schematic Configuration of Beam Dump Apparatus
   5.2 Configuration of Attenuator Module
   5.3 Operation of Attenuator Module
   5.4 Configuration of Beam Dump Module
   5.5 Operation of Beam Dump Module
   5.6 Detailed Configuration of Beam Dump Apparatus
   5.7 Operation of Beam Dump Apparatus: While Cutting Off Laser Beam
   5.8 Operation of Beam Dump Apparatus: While Outputting Laser Beam
   5.9 Operation of Beam Dump Apparatus: While Adjusting Optical Path of Laser Beam
   5.10 Operation of Beam Dump Apparatus: While Adjusting Output of Laser Beam
   5.11 Effects
   5.12 Modification to the First Embodiment
      5.12.1 Alternate Configuration of Beam Dump Apparatus
      5.12.2 Operation of Alternate Configuration of Beam Dump Apparatus
6. Second Embodiment
   6.1 Configuration
   6.2 Operation
7. Third Embodiment
   7.1 Configuration
   7.2 Operation
   7.3 Effects
8. Fourth Embodiment
   8.1 Configuration
   8.2 Operation
   8.3 Effects
9. Fifth Embodiment
   9.1 Configuration
   9.2 Operation
   9.3 Effects
   9.4 First Modification to Fifth Embodiment
      9.4.1 Configuration
      9.4.2 Effects
   9.5 Second Modification to Fifth Embodiment
      9.5.1 Configuration
      9.5.2 Effects 10. Sixth Embodiment
    10.1 Configuration
    10.2 Operation
    10.3 Effects
    10.4 Modification to Sixth Embodiment
        10.4.1 Configuration
        10.4.2 Operation
        10.4.3 Effects Embodiments of the present disclosure will be described in detail below with reference to the attached drawings. The embodiments to be described below are illustrative examples of the present disclosure, and do not limit the scope of the present disclosure. In addition, not all of the configurations and operations of the embodiments to be described below are necessarily essential configurations and operations of the present disclosure. Note that common constituent elements will be denoted with the same reference numbers, and redundant descriptions will be omitted.

1. Overview

The embodiments of the present disclosure may be related to a beam dump apparatus which is employed in an EUV light generating apparatus, a laser apparatus equipped with the beam dump apparatus, and an EUV light generating apparatus.

2. Terms

The terms which are utilized in the present disclosure are defined as follows. A "droplet" may be a droplet of a molten target material. The shape of the droplet may be substantially spherical. A "plasma generating region" may be a three dimensional space which is set in advance as a space in which plasma is generated. The term "upstream" as it relates to a laser beam may refer to a side closer to a light source than a target position along a propagation path of the laser beam. In addition, the term "downstream" as it relates to a laser beam may refer to a side farther from a light source than a target position along a propagation path of the laser beam.

3. Overview of EUV Light Generating System 3.1 Configuration

FIG. 1 is a diagram that schematically illustrates an example of the configuration of an exemplary EUV light generating system of the LPP type. An EUV light generating apparatus 1 may be employed with at least one laser apparatus 3. In the present disclosure, a system that includes the EUV light generating apparatus 1 and the laser apparatus 3 is referred to as an EUV light generating system 11. As illustrated in FIG. 1 and described in detail later, the EUV light generating apparatus 1 may include a chamber 2 and a target supply unit 26. The chamber 2 may be capable of being sealed. The target supply unit 26 may be mounted on the chamber 2 so as to penetrate through a wall of the chamber 2, for example. The material which is supplied by the target supply unit 26 as a target substance may include, but is not limited to, tin, terbium, gadolinium, lithium, xenon, or any combination including two or more thereof.

A wall of the chamber 2 may have at least one aperture penetrating therethrough. A window 21 may be provided at the aperture. A pulsed laser beam 32 which is output from the laser apparatus 3 may be transmitted through the window 21. An EUV light collecting mirror 23 having a spheroidal reflective surface may be provided in the chamber 2, for example. The EUV light collecting mirror 23 may have a first focal point and a second focal point. The surface of the EUV light collecting mirror 23 may have a multi layered reflective film, in which molybdenum layers and silicon layers are alternately laminated, formed thereon, for example. It is preferable for the EUV light collecting mirror 23 to be provided such that the first focal point thereof is positioned in a plasma generating region 25 and the second focal point thereof is positioned at an intermediate focal (IF) point 292, for example. The EUV light collecting mirror 23 may have an aperture 24 formed at the center thereof, and a pulsed laser beam 33 may pass through the aperture 24.

The EUV light generating apparatus 1 may further include an EUV light generation control unit 5, a target sensor 4, etc. The target sensor 4 may have an image capturing function and may detect the presence, the trajectory, the position, the velocity, etc. of a target 27.

In addition, the EUV light generating apparatus 1 may include a connecting portion 29 that enables the interior of the chamber 2 to be in communication with the interior of an exposure apparatus 6. A wall 291 having an aperture 293 formed therethrough may be provided in the connecting portion 29. The wall 291 may be provided such that the aperture 293 is positioned at the second focal point of the EUV light collecting mirror 23.

Further, the EUV light generating apparatus 1 may additionally include a laser beam propagation direction control unit 34, a laser beam collecting mirror 22, and a target collecting unit 28 for collecting the target 27. The laser beam propagation direction control unit 34 may be equipped with an optical element for regulating the propagation direction of a laser beam, and an actuator for adjusting the position, orientation, etc. of the optical element.

3.2 Operation

Referring to FIG. 1, the pulsed laser beam 31 which is output from the laser apparatus 3 may propagate via the laser beam propagation direction control unit 34, be transmitted through the window 21 as a pulsed laser beam 32, and then enter the chamber 2. The pulsed laser beam 32 may propagate through the chamber 2 along at least one laser beam path, be reflected by the laser beam collecting mirror 22, and be irradiated onto at least one target 27 as the pulsed laser beam 33.

The target supply unit 26 may be configured to output the target 27 toward the plasma generating region 25 in the interior of the chamber 2. At least one pulse which is included in the pulsed laser beam 33 may be irradiated onto the target 27. The target 27 which is irradiated by the pulsed laser beam turns into plasma, and radiant light 251 is emitted from the plasma. EUV light 252, which is included in the radiant light 251, may be selectively reflected by the EUV light collecting mirror 23. EUV light 252 which is reflected by the EUV light collecting mirror 23 may be focused at the intermediate focal point 292, and output to the exposure apparatus 6. Note that a plurality of pulses which are included in the pulsed laser beam 33 may be irradiated onto a single target 27.

An EUV light generation control unit 5 may be configured to totally control the entire EUV light generating system 11. The EUV light generation control unit 5 may be configured to process image data of the target 27 captured by the target sensor 4 or the like. In addition, the EUV light generation control unit 5 may be configured to control the timing at which the target 27 is output, the output direction of the target 27, etc., for example. Further, the EUV light generation control unit 5 may control at least one of the oscillation timing of the laser apparatus 3, the propagation direction of the pulsed laser beam 32, and the focal position of the pulsed laser beam 33, for example. The above items which are controlled are merely examples, and other additional items may be controlled as necessary.

4. EUV Light Generating System Equipped with Beam Dump Apparatus: Comparative Example Next, a comparative example of an EUV light generating apparatus will be described in detail with reference to the drawings.

4.1 Configuration

Figure 2:
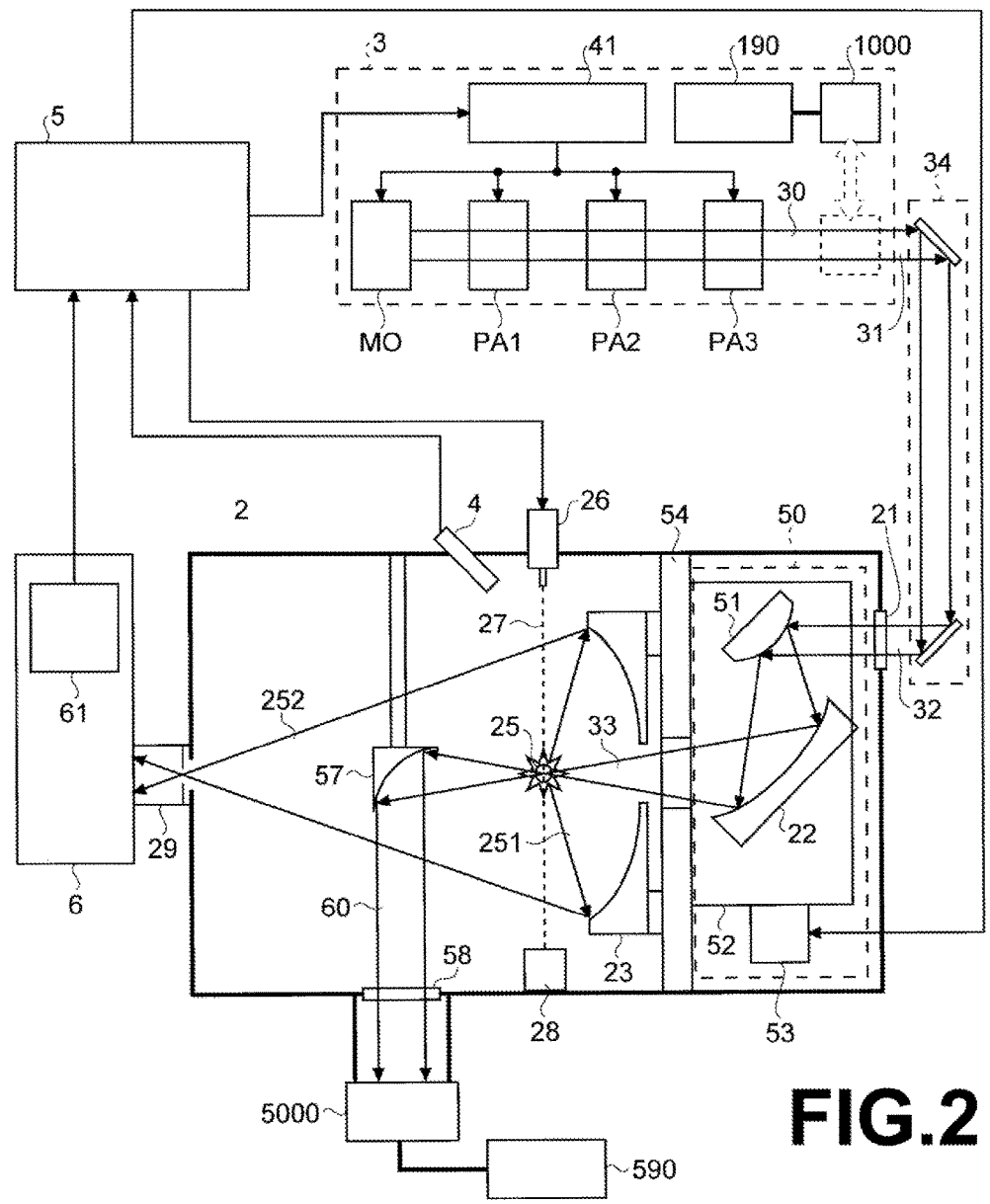
FIG. 2 is a diagram that schematically illustrates an example of the configuration of an EUV light generating apparatus of a comparative example.

FIG. 2 is a diagram that schematically illustrates an example of the configuration of the EUV light generating apparatus of the comparative example. The EUV light generating apparatus illustrated in FIG. 2 may include a chamber 2, a laser apparatus 3, a laser propagation direction control unit 34, and an EUV light generation control unit 5 in a manner similar to the EUV light generating apparatus 1 illustrated in FIG. 1.

The laser apparatus 3 may include a master oscillator MO, one or more amplifiers PA1~PA3, a laser control unit 41, and a beam dump apparatus 1000. The amplifiers PA1~PA3 may be provided along the optical path of a laser beam 31 which is output by the master oscillator MO. The master oscillator MO and the amplifiers PA1~PA3 may be connected to the laser control unit 41. The laser control unit 41 may be connected to the EUV light generation control unit 5.

The beam dump apparatus 1000 may be provided such that it is movable between a cutoff position at which the laser beam 31 is cut off, and a standby position at which the laser beam 31 is not cut off. The beam dump apparatus 1000 may be connected to a cooling apparatus 190.

The cooling apparatus 190 may decrease the temperature of a cooling medium. The cooled cooling medium may circulate between the beam dump apparatus 1000 and the cooling apparatus 190.

The chamber 2 may include a target supply unit 26, a target sensor 4, a window 21, a laser collecting optical system 50, a plate 54, an EUV light collecting mirror 23, and a target collecting unit 28.

A laser beam 32 which is output from the laser beam propagation direction control unit 34 may be input to the laser collecting optical system 50 via the window 21. The laser collecting optical system 50 may be configured and provided such that laser beam 33 is collected in a plasma generating region 25. The laser collecting optical system 50 may include a laser beam collecting mirror 22. The laser beam collecting mirror 22 may be an off axis parabolic mirror. The laser collecting optical system 50 may further include a convex mirror 51 that faces the laser beam collecting mirror 22. The convex mirror 51 may be an ellipsoidal mirror. The laser collecting optical system 50 may be fixed on a movable plate 52. A laser beam manipulator 53 may be connected to the movable plate 52.

The laser beam manipulator 53 may be capable of moving the movable plate 52 in the directions of the X axis, the Y axis, and the Z axis, such that the focal position of the laser beam 33 can be moved to positions which are specified by the EUV light generation control unit 5.

A dumper mirror 57 may be provided along a laser beam path downstream from the plasma generating region 25. The dumper mirror 57 may be configured to reflect the laser beam 33 which has passed through the plasma generating region 25 toward a beam dump apparatus 5000. The dumper mirror 57 may collimate the laser beam 33 that enters thereinto. The dumper mirror 57 may be an off axis parabolic mirror. The dumper mirror 57 may be equipped with a heater that heats the reflecting surface thereof to the melting point of the target substance or greater.

The beam dump apparatus 5000 may be provided at a position at which a laser beam 60 reflected by the dumper mirror 57 enters thereinto. The laser beam 60 may enter the beam dump apparatus 5000 via a dumper window 58 provided within a wall of the chamber. The beam dump apparatus 5000 may be connected to a cooling apparatus 590.

The cooling apparatus 590 may have the same configuration as that of the cooling apparatus 190. Alternatively, the cooling apparatus 190 may be employed in common by the beam dump apparatus 5000 and the beam dump apparatus 1000, instead of providing the cooling apparatus 590.

4.2 Operation

Next, an example of the operation of the EUV light generating apparatus illustrated in FIG. 2 will be described. In the case that EUV light is to be output, the EUV light generation control unit 5 may cause the target supply unit 26 to output the target 27 according to EUV light output commands from an exposure apparatus 6. At this time, the beam dump apparatus 1000 may be in the standby position.

The target sensor 4 may detect the target 27, and output detection signals to the EUV light generation control unit 5. The target detection signals may indicate the timings at which the target 27 passes through a predetermined position.

The EUV light generation control unit 5 may output light emission triggers, which are delayed for a predetermined delay time from the target detection signals, to the laser control unit 41 of the laser apparatus 3.

The laser control unit 41 may output laser output signals to the master oscillator MO when the light emission triggers are input thereto. At this time, the laser control unit 41 may set the amplifiers PA1~PA3 in a standby state capable of amplification. The master oscillator MO may output the laser beam 31 in synchronization with the laser output signals. The output laser beam 31 may be amplified by the amplifiers PA1~PA3, pass through the laser beam propagation direction control unit 34 and the window 21, and enter the chamber 2. The power of the laser beam 31 which is output from the laser apparatus 3 may be within a range from several kW (kilowatts) to several tens of kW.

The laser beam 32 that enters the chamber 2 may be collected by the laser collecting optical system 50. The collected laser beam 33 may be irradiated onto the target 27 which has reached the plasma generating region 25. EUV light 252 may radiate from plasma, which is generated by the target 27 being irradiated by the laser beam 33.

The EUV light generation control unit 5 may adjust the position onto which the laser beam 33 is irradiated, by controlling the laser beam manipulator 53. In addition, the EUV light generation control unit 5 may change the amount of delay time from the target detection signals to the light emission triggers.

The irradiation diameter of the laser beam 33 with respect to the target 27 may be greater than the diameter of the target 27. In this case, a portion of the laser beam 33 may enter the dumper mirror 57 without being irradiated on the target 27.

The laser beam 60 which is reflected by the dumper mirror 57 may be absorbed by the beam dump apparatus 5000 via the dumper window 58. The absorbed laser beam 60 may be converted into heat. The heat generated in this manner may be exhausted to the exterior by the cooling apparatus 590.

There are cases in which the target 27 is not irradiated by the laser beam 33. For example, there are cases in which the output of the laser beam 31 is continued while supply of the target 27 is ceased when stabilizing the output of the laser apparatus 3 or adjusting the optical path, or cases in which the target 27 is intentionally prevented from being irradiated by the laser beam 33 by changing the delay time. In such cases, the laser beam 33 may enter the dumper mirror 57 while maintaining its power, due to not being irradiated onto the target 27.

The beam dump apparatus 1000 may be positioned in the cutoff position in the case that the operation of the EUV light generation apparatus is ceased for a long period of time or during maintenance.

There are cases in which the power of the laser beam 31 which is output from the laser apparatus 3 is decreased to several W for reasons of safety when adjusting the laser beam propagation direction control unit 34 or the laser collecting optical system 50. In such cases, the laser control unit 41 may control the master oscillator MO and the amplifiers PA1~PA3 such that the power of the laser beam 31 which is output from the laser apparatus 3 becomes several W. In the present disclosure, adjustment of the laser beam propagation direction control unit 34 or the laser collecting optical system 50 will be referred to as "laser beam optical path adjustment".

4.4 Problems

In the case that the laser beam 31 is output at different powers during laser beam optical path adjustment and during output of EUV light as in the laser apparatus 3 of the comparative example, the thermal load exerted onto optical components within the laser apparatus 3 may be different corresponding to pulse energies. That is, changes in the properties of the optical components caused by heat may differ during laser beam optical path adjustment and during output of EUV light. For this reason, the beam divergence and the cross sectional intensity distribution of the laser beam 31 may differ during laser beam optical path adjustment and during output of EUV light. This is presumed to be because the thermal lens effect of the optical components depends on thermal loads.

If the beam divergence and the cross sectional intensity distribution, which are adjusted during laser beam optical path adjustment, change during EUV light output, there is a possibility that the target will not be appropriately irradiated by the laser beam 33 during EUV light output. For this reason, a configuration which is capable of laser beam optical path adjustment employing a laser beam 31 having the same beam divergence and cross sectional intensity distribution as that during EUV light output is desired.

In addition, increased output of the EUV light 252 may be required in order to improve the throughput of the exposure apparatus 6. Increased output of the laser beam 31 may be required to increase the output of the EUV 252. In the case that the output of the laser beam 31 is increased, there are cases in which the capacity of the beam dump apparatus 1000 that receives the laser beam 31 and the capacity of the beam dump apparatus 5000 that receives the laser beam 33 are desired to be increased.

However, there are cases in which commercially available beam dumpers cannot be utilized, depending on the output energies of the laser beams 31 and 33. In such cases, a dedicated high capacity beam dump apparatuses 1000 and 5000 may be developed and produced. However, such a measure would invite increases in cost.

In addition, the beam dump apparatus 5000 may be mounted on the outer wall of the chamber 2, as illustrated in FIG. 2. A great number of devices, such as various measuring apparatuses, may be mounted on the outer wall of the chamber 2 in addition to the beam dump apparatus 5000. However, the area of the outer wall of the chamber 2 is limited. For this reason, there are cases in which mounting of devices including the beam dump apparatus 5000 on the outer wall of the chamber 2 will become difficult, if the size of the beam dump apparatus 5000 increases accompanying an increase in the capacity thereof.

The following embodiments are examples of beam dump apparatuses which are capable of laser beam optical path adjustment employing a laser beam having the same beam divergence and cross sectional intensity distribution as that during EUV light output, as well as laser apparatuses and EUV light generating apparatuses equipped with such beam dump apparatuses. In addition, the following embodiments are also examples of beam dump apparatuses which are easily mounted on the outer wall of the chamber 2 even if the capacities thereof are increased.

5. First Embodiment

First, a beam dump apparatus according to a first embodiment, as well as a laser apparatus and an EUV light generating apparatus equipped with the beam dump apparatus, will be described in detail with reference to the drawings.

5.1 Schematic Configuration of Beam Dump Apparatus

Figure 3:
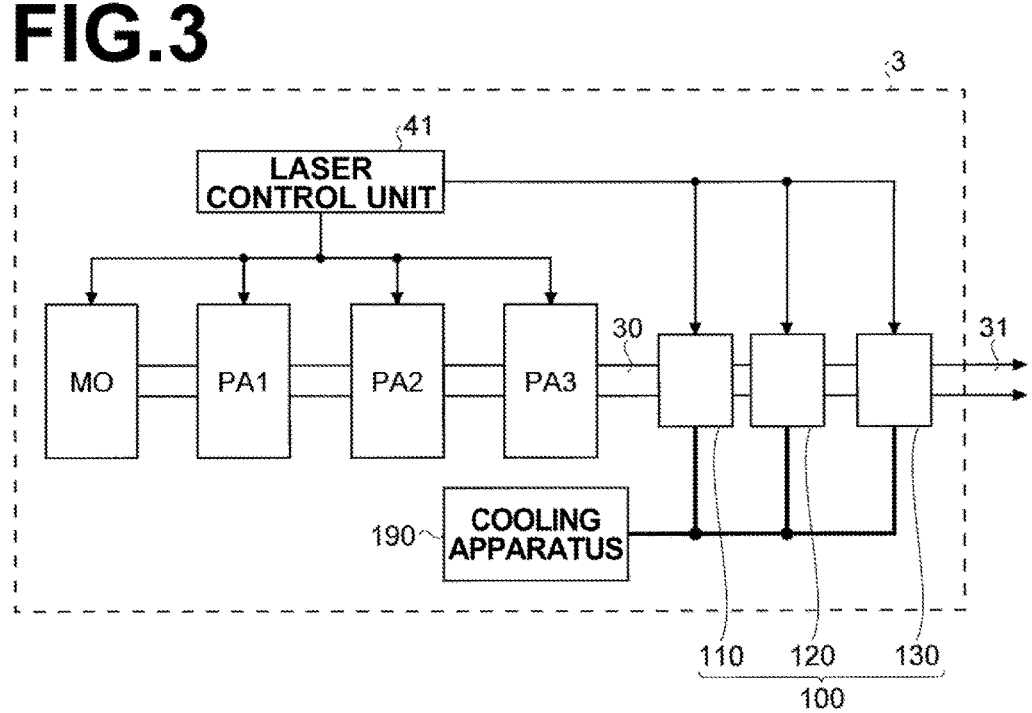
FIG. 3 is a diagram that schematically illustrates an example of the configuration of a laser apparatus that includes a beam dump apparatus according to a first embodiment.

FIG. 3 is a diagram that schematically illustrates an example of the configuration of a laser apparatus that includes a beam dump apparatus according to the first embodiment. As illustrated in FIG. 3, the laser apparatus 3 may be equipped with a laser control unit 41, a master oscillator MO, amplifiers PA1~PA3, a beam dump apparatus 100, and a cooling apparatus 190.

The beam dump apparatus 100 may include one or more attenuator modules 110 and 120, and a beam dump module 130.

The attenuator modules 110 and 120 and the beam dump module 130 may be connected to the cooling apparatus 190 such that a cooling medium such as water, which is supplied from the cooling apparatus 190, is capable of circulating therethrough.

The laser control unit 41 may be connected to each of the attenuator modules 110 and 120 as well as the beam dump module 130. Specifically, the laser control unit 41 may be connected to a uniaxial stage of each module. The uniaxial stages will be described later.

5.2 Configuration of Attenuator Module

Figure 4:
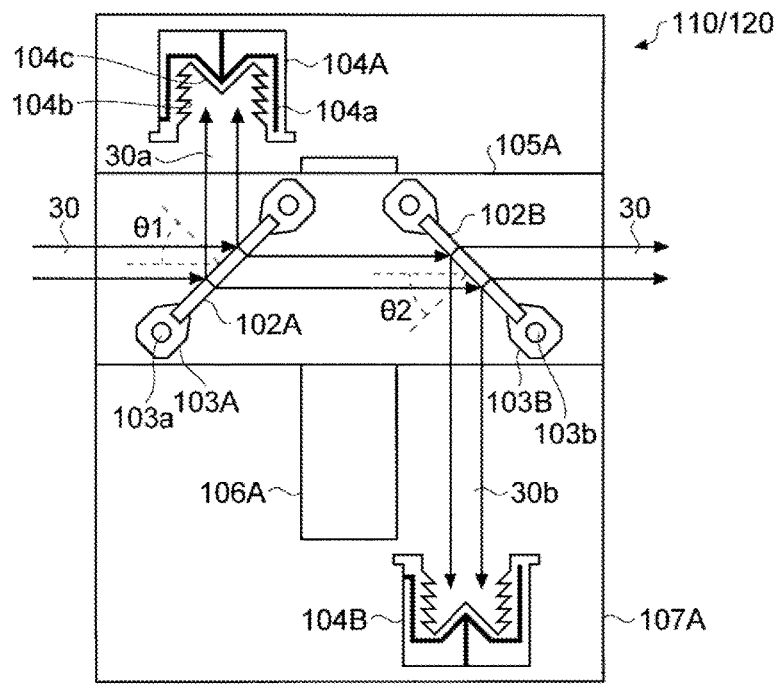
FIG. 4 is a diagram that schematically illustrates an example of the configuration of an attenuator module according to the first embodiment.
Figure 5:
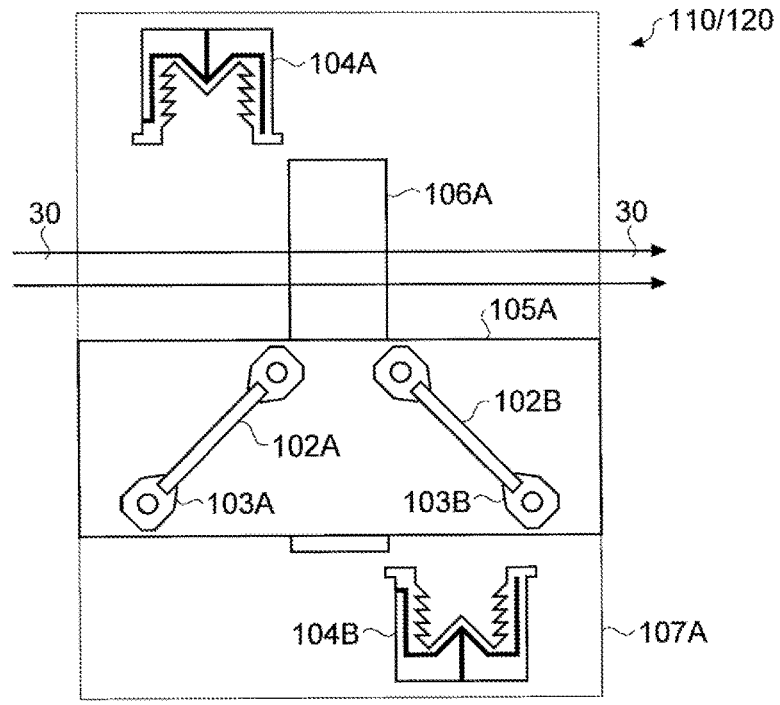
FIG. 5 is another diagram that schematically illustrates an example of the configuration of the attenuator module according to the first embodiment.

FIG. 4 and FIG. 5 are diagrams that schematically illustrate examples of the configuration of each attenuator module. FIG. 4 illustrates a case in which a movable plate of each attenuator module is in a low output arrangement (first position), and FIG. 5 illustrates a case in which the movable plate of each attenuator module is in a high output arrangement (second position).

As illustrated in FIG. 4 and FIG. 5 the attenuator modules 110 and 120 may be equipped with an even number of beam splitters 102A and 102B, a plurality of beam dumpers 104A and 104B, a movable plate 105A, a base plate 107$k$ and a uniaxial stage 106A.

The even number of beam splitters 102A and 102B may be provided such that the incident angles of a laser beam 30 that enters thereinto are crossed. For example, the beam splitters 102A and 102B may be provided such that an incident angle θ2 into the beam splitter 102B is −45° in the case that an incident angle θ1 into the beam splitter 102A is 45°.

Each of the beam splitters 102A and 102B may be constituted by a substrate formed by zinc selenide (ZnSe), diamond, or the like. A coating having an appropriate reflectance may be administered on the surface of the substrate into which the laser beam 30 enters. Meanwhile, an antireflection film may be coated on the surface of the substrate from which the laser beam 30 is output. The coatings may be multiple layer films. In addition, the substrate may be a plane parallel substrate or may be a wedge substrate.

The beam splitters 102A and 102B may be held by splitter holders 103A and 103B, respectively. Each of the splitter holders 103A and 103B may fix each of the beam splitters 102A and 102B to the movable plate 105A such that the inclinations thereof with respect to the propagation direction of the laser beam 30 are maintained. Channels 103a and 103b, through which the cooling medium supplied from the cooling apparatus 190 pass, may be respectively provided in the interiors of each of the splitter holders 103A and 103B.

Each of the beam dumpers 104A and 104B may be provided at positions at which light beams 30a and 30b, respectively reflected by the beam splitter 102A and 102B, enter thereinto. Commercially available beam dumpers may be employed as the beam dumpers 104A and 104B.

A cone portion 104c and a corrugated portion 104b may be provided in the interiors of each of the beam dumpers 104A and 104B. The cone portion 104c may be a conically shaped portion. The cone portion 104c may be of a shape that absorbs a portion of an incident laser beam 30a or 30b and diffuses a portion of the incident laser beam 30a or 30b toward the periphery. The corrugated portion 104b may be of a shape that suppresses diffusion of the laser beam 30a or 30b, which has been diffused by the cone portion 104c, to the exterior of the beam dumpers 104A and 104B. The corrugated portion 104b may absorb the laser beam 30a or 30b, which has been diffused by the cone portion 104c.

Channels 104a, through which the cooling medium supplied from the cooling apparatus 190 passes, may be provided in the interior of each of the beam dumpers 104A and 104B. The channels 104a may be provided under the surfaces of the cone portion 104c and the corrugated portion 104b in the vicinity of the surfaces. The channels 104a may be in communication with the channels 103a and 103b within the interiors of the splitter holders 103A and 103B.

The uniaxial stage 106A may be fixed to the base plate 107A. The uniaxial stage 106A may be capable of moving the movable plate 105A with respect to the base plate 107A. The uniaxial stage 106A may be constituted by a combination of a ball screw and a motor, an extendable and retractable air cylinder, or the like.

5.3 Operation of Attenuator Module

Each of the beam splitters 102A and 102B as well as each of the beam dumpers 104A and 104B may be cooled by the cooling medium supplied from the cooling apparatus 190 circulating therethrough.

The uniaxial stage 106A may move the movable plate 105A according to signals from the laser control unit 41. The positions of the movable plate 105A may include the low output arrangement (first position) illustrated in FIG. 4 and the high output arrangement (second position) illustrated in FIG. 5.

In the case that the movable plate 105A is in the low output arrangement as illustrated in FIG. 4, the beam splitters 102A and 102B may be provided along the optical path of the laser beam 30. Each of the beam splitters 102A and 102B may transmit a portion of the laser beam 30 and reflect portions of the laser beam as reflected beams 30a and 30b. As a result, the laser beam 30, of which the energy has been reduced, may be output from the attenuator module 110 or 120.

The reflected beams 30a and 30b may enter the beam dumper 104A and 104B, respectively. Each of the beam dumpers 104A and 104B may convert the incident reflected beams 30a and 30b into heat. The heat generated at each of the beam dumpers 104A and 104B may be exhausted by the cooling apparatus 190 using the cooling medium.

In addition, in the case that the movable plate 105A is in the high output arrangement as illustrated in FIG. 5, the beam splitters 102A and 102B may be provided outside the optical path of the laser beam 30. As a result, the laser beam may be output from the attenuator module 110 or 120 without the energy thereof being reduced.

5.4 Configuration of Beam Dump Module

Figure 6:
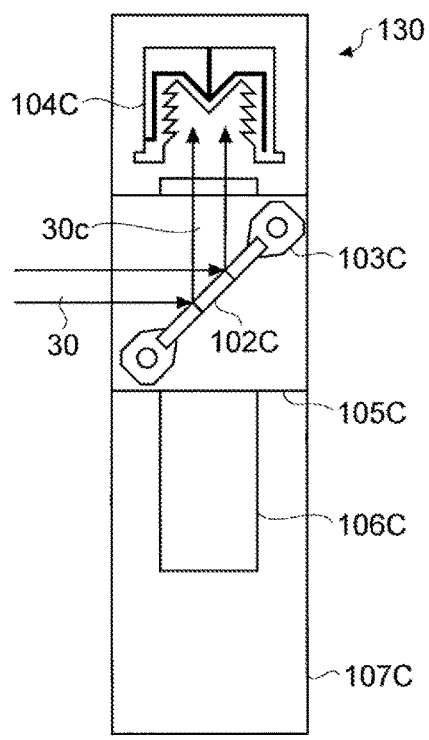
FIG. 6 is a diagram that schematically illustrates an example of the configuration of a beam dump module according to the first embodiment.
Figure 7:
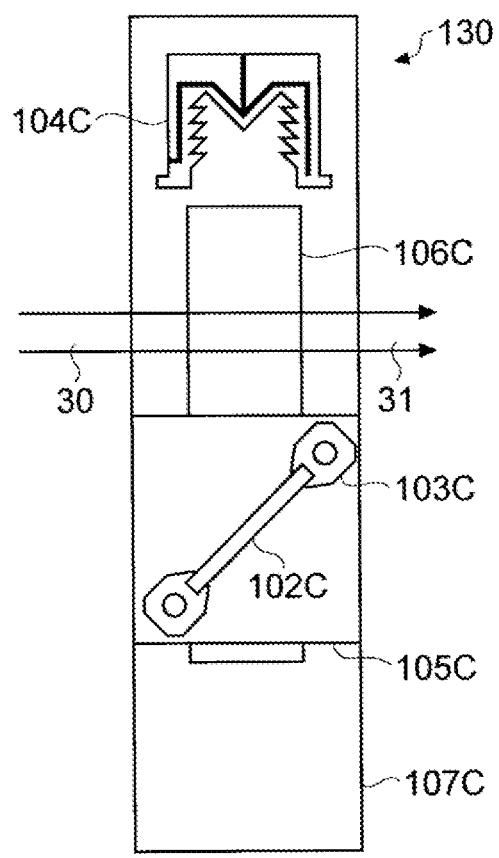
FIG. 7 is another diagram that schematically illustrates an example of the configuration of the beam dump module according to the first embodiment.

FIG. 6 and FIG. 7 are diagrams that schematically illustrate examples of the configuration of the beam dump module. FIG. 6 illustrates a case in which a movable plate of the beam dump module is in a laser beam cutoff arrangement (third position), and FIG. 7 illustrates a case in which the movable plate of the beam dump module is in a laser beam output arrangement (fourth position).

As illustrated in FIG. 6 and FIG. 7, the beam dump module 130 may be equipped with a high reflectance mirror 102C, a beam dumper 104C, a movable plate 105C, a base plate 107C, and a uniaxial stage 106C.

The high reflectance mirror 102C may be a copper substrate on which a gold coating is administered, or may be a silicon substrate coated with a high reflectance multiple layer film.

The high reflectance mirror 102C may be held by a mirror holder 103C. The mirror holder 103C may be equipped with the same structures as those of the splitter holders 103A and 103B. The mirror holder 103C may hold the high reflectance mirror 102C such that a reflected beam 30c reflected thereby enters the beam dumper 104C. The mirror holder 103C may be fixed to the movable plate 105C.

The other structures of the beam dump module 130 may be the same as those of the attenuator modules 110 and 120.

5.5 Operation of Beam Dump Module

The uniaxial stage 106C may move the movable plate 105C according to signals from the laser control unit 41. The positions of the movable plate 105C may include the laser beam cutoff arrangement (third position) illustrated in FIG. 6, and the laser beam output arrangement (fourth position) illustrated in FIG. 7.

In the case that the movable plate 105C is in the laser beam cutoff arrangement as illustrated in FIG. 6, the high reflectance mirror 102C may be provided along the optical path of the laser beam 30. The reflected beam 30c reflected by the high reflectance mirror 102C may enter the beam dumper 104C. As a result, the laser beam 30 may be cut off, and a laser beam 31 may not be output from the beam dump module 130.

In addition, in the case that the movable plate 105C is in the laser beam output arrangement as illustrated in FIG. 7, the high reflectance mirror 102C may be provided outside the optical path of the laser beam 30. As a result, the laser beam 30 may not be cut off, and be output from the beam dump module 130 as the laser beam 31.

5.6 Detailed Configuration of Beam Dump Apparatus

FIG. 8 through FIG. 11 are diagrams that illustrate examples of the configuration of the beam dump apparatus 100 illustrated in FIG. 3. As illustrated in FIG. 8 through FIG. 11, the beam dump apparatus 100 may be equipped with the attenuator modules 110 and 120 (refer to FIG. 4 and FIG. 5), and the beam dump module 130 (refer to FIG. 6 and FIG. 7).

Here, the specifications of the beam splitters 102A and 102B as well as the beam dumpers 104A~104C in the case that the output of the laser apparatus 3 is 20 kW will be described as an example. Note that the attenuator modules 110 and 120 may be of the same configuration.

In this case, the specifications may be as follows.
Attenuator Module 110
Beam Splitter 102A: Reflectance=33%; Transmissivity=67%
Beam Splitter 102B: Reflectance=50%; Transmissivity=50%
Beam Dumper 104A: Capacity=10 kW
Beam Dumper 104B: Capacity=10 kW
Attenuator Module 120
Beam Splitter 102A: Reflectance=99%; Transmissivity=1%
Beam Splitter 102B: Reflectance=90%; Transmissivity=10%
Beam Dumper 104A: Capacity=10 kW
Beam Dumper 104B: Capacity=1 kW
Beam Dump Module 130
High Reflectance Mirror 102C: Reflectance=99% or greater
Beam Dumper 104C: Capacity=1 kW In the case that the specifications are those described above, commercially available beam dumpers having capacities of 10 kW or 1 kW may be utilized as the beam dumpers 104A~104C.

5.7 Operation of Beam Dump Apparatus: While Cutting Off Laser Beam

Figure 8:
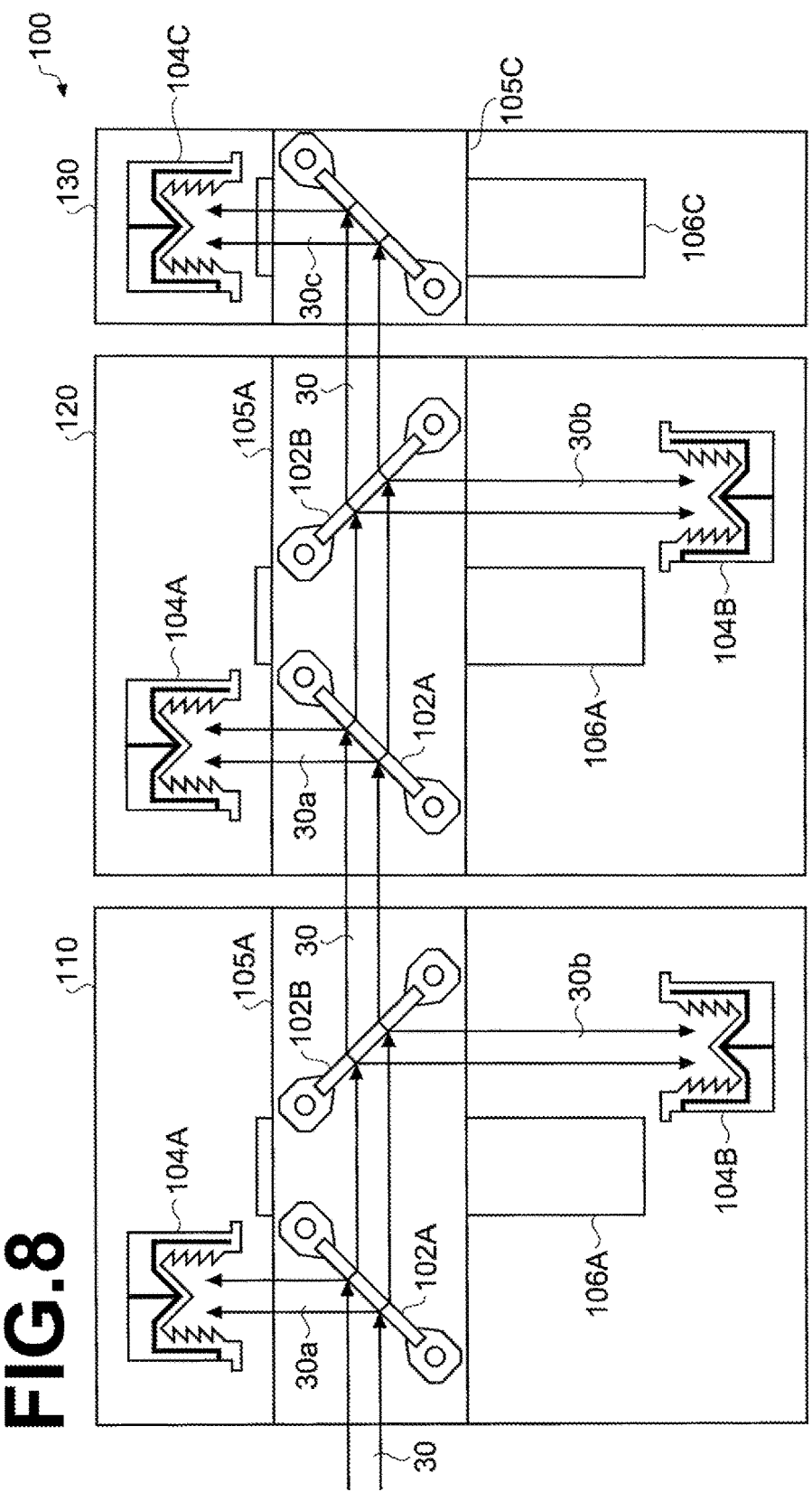
FIG. 8 is a diagram that schematically illustrates an example of the configuration of a beam dump apparatus according to the first embodiment.

Next, the operation of the beam dump apparatus 100 will be described in detail with reference to the drawings. FIG. 8 is a diagram that schematically illustrates an example of the arrangements within each module when the laser beam is being cut off.

In the operation of cutting off the laser beam, the laser control unit 41 may receive a laser beam cutoff signal from the EUV light generation control unit 5, for example. The laser beam cutoff signal may be a signal that commands that output of the laser beam 31 from the laser apparatus 3 be ceased.

In response to the laser beam cutoff signal, the laser control unit 41 may place the attenuator modules 110 and 120 in the low output arrangement and set the beam dump module 130 to be in the laser beam cutoff arrangement, as illustrated in FIG. 8. The laser control unit 41 may control the uniaxial stages 106A and 106C of each of the modules to set the modules in these arrangements.

By setting the modules in these arrangements, the laser beam 30 may enter the beam splitters 102A and 102B of each of the attenuator modules 110 and 120 and the high reflectance mirror 102C. At this time, the power of the laser beam 30 is reduced by the beam splitters 102A and 102B of each of the attenuator modules 110 and 120. Thereafter, the laser beam 30 which is output from the attenuator module 120 is shifted away from an optical path for output by the high reflectance mirror 120C.

The reflected beams 30a~30c which are reflected by the beam splitters 102A and 102B and the high reflectance mirror 102C may respectively enter the beam dumpers 104A~104C.

In the case that a 20 kW laser beam 30 enters the beam dump apparatus 100, the energy that enters each of the beam dumpers 104A~104C are as follows.
Attenuator Module 110
Beam Dumper 104A: 6.6 kW
Beam Dumper 104B: 6.7 kW
Attenuator Module 120
Beam Dumper 104A: 6.6 kW
Beam Dumper 104B: 60 W
Beam Dump Module 130
Beam Dumper 104C: 6.7 kW In this case, even if commercially available beam dumpers having capacities of 10 kW or 1 kW are utilized as the beam dumpers 104A~104C, the energies of the reflected beams 30a~30b that enter the beam dumpers are these capacities or less. As a result, the beam dump apparatus 100 may cut off the 20 kW laser beam.

5.8 Operation of Beam Dump Apparatus: While Outputting Laser Beam

Figure 9:
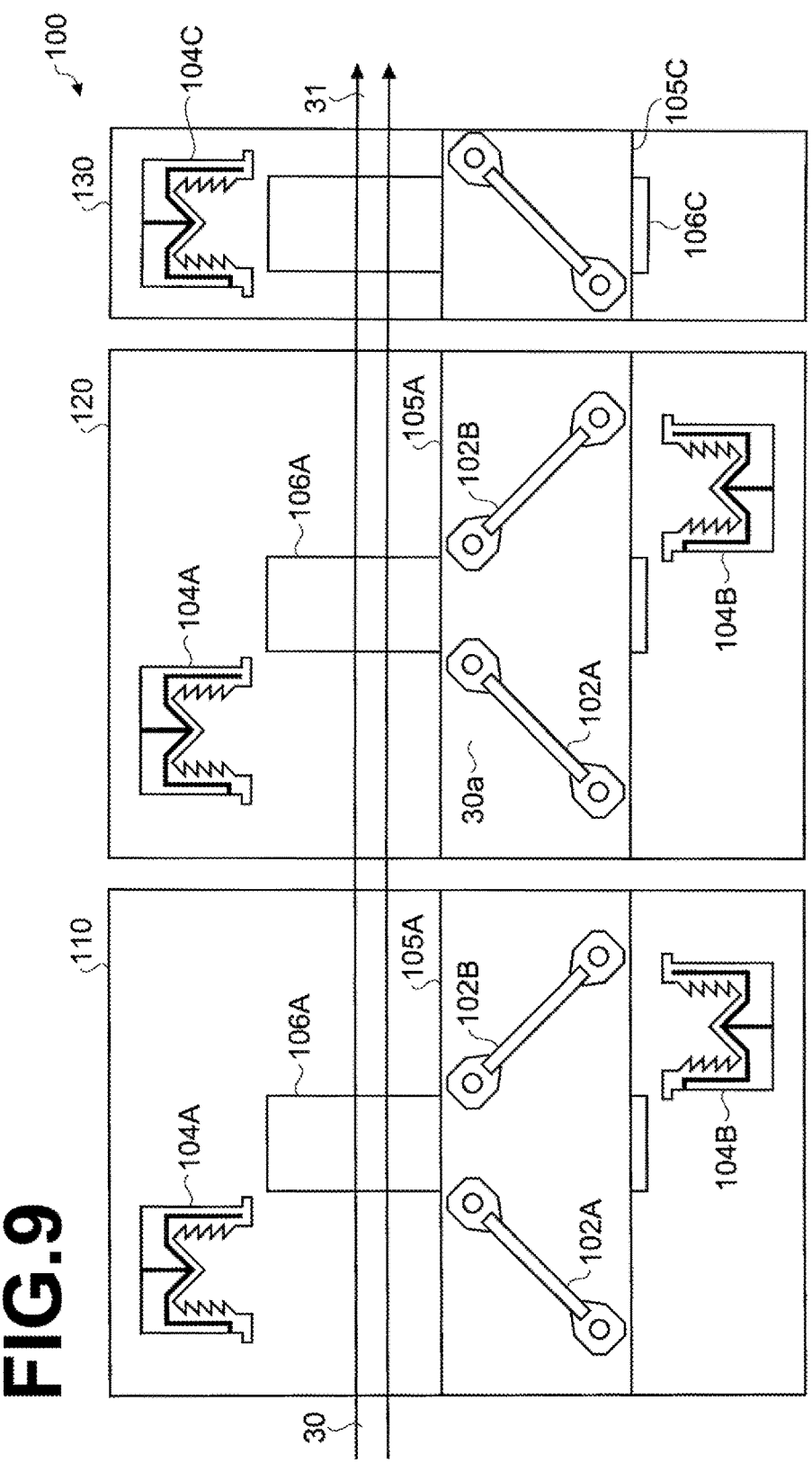
FIG. 9 is another diagram that schematically illustrates an example of the configuration of the beam dump apparatus according to the first embodiment.

FIG. 9 is a diagram that schematically illustrates an example of the arrangements within each module when the laser beam is being output (during output of EUV light, for example).

In the operation of outputting the laser beam, the laser control unit 41 may receive a laser beam output signal from the EUV light generation control unit 5, for example. The laser beam output signal may be a signal that commands output of the laser beam 31 from the laser apparatus 3.

In response to the laser beam output signal, the laser control unit 41 may place the attenuator modules 110 and 120 in the high output arrangement and set the beam dump module 130 to be in the laser beam output arrangement, as illustrated in FIG. 9. The laser control unit 41 may control the uniaxial stages 106A and 106C of each of the modules to set the modules in these arrangements.

By setting the modules in these arrangements, the laser beam 30 may be output from the beam dump apparatus 100 without entering the beam splitters 102A and 102B and the high reflectance mirror 102C.

In this manner, a 20 kW laser beam 30, for example, may be output from the beam dump apparatus 100 as is, as a 20 kW laser beam 31, during laser beam output.

5.9 Operation of Beam Dump Apparatus: While Adjusting Optical Path of Laser Beam FIG. 10 is a diagram that schematically illustrates an example of the arrangements within each module when the optical path of the laser beam is being adjusted.

In the operation of adjusting the optical path of the laser beam, the laser control unit 41 may receive a laser beam optical path adjustment signal from the EUV light generation control unit 5, for example. The laser beam optical path adjustment signal may be a signal that commands or notifies execution of laser beam optical path adjustment.

Figure 10:
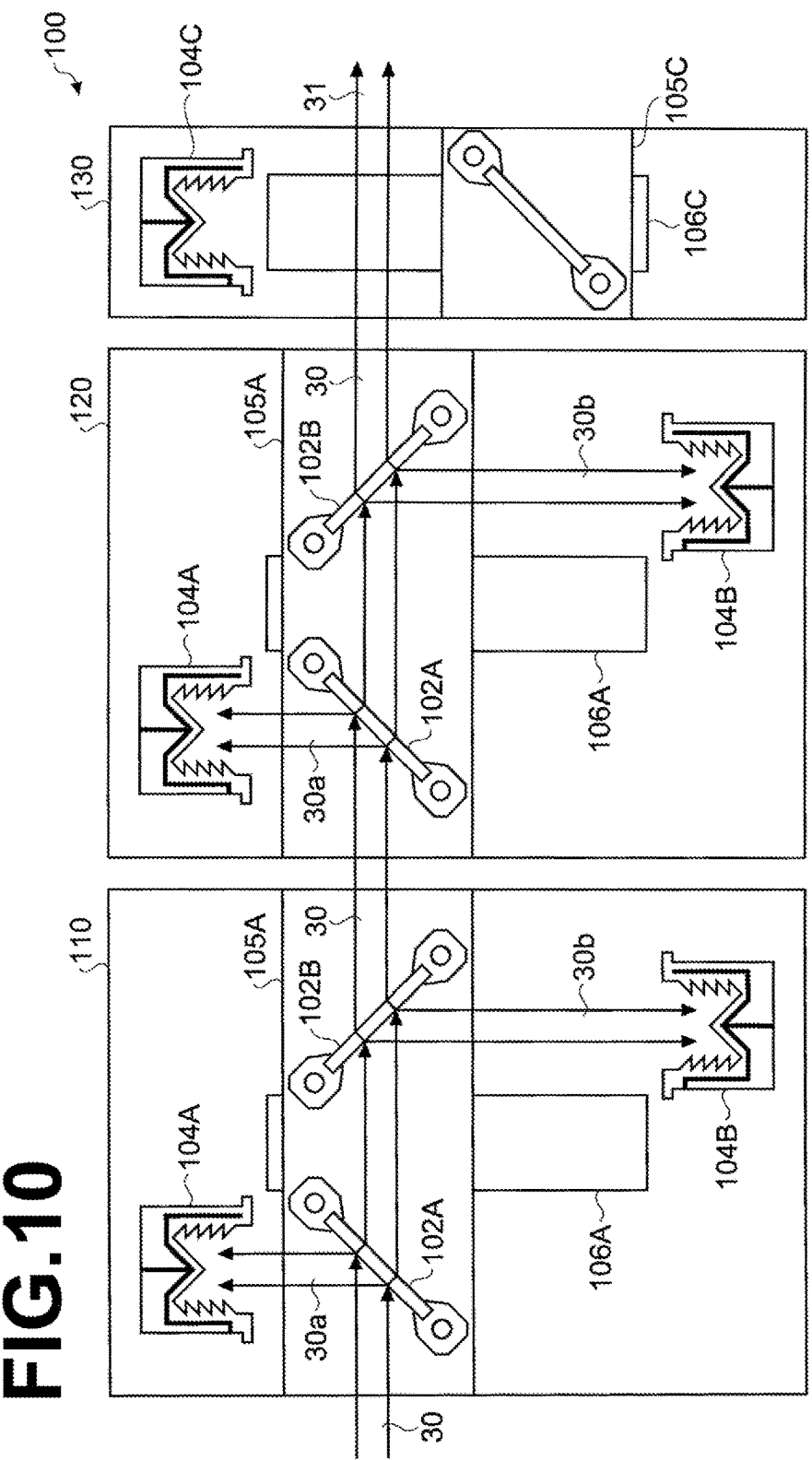
FIG. 10 is another diagram that schematically illustrates an example of the configuration of the beam dump apparatus according to the first embodiment.

In the operation of adjusting the optical path of the laser beam, the laser control unit 41 may place the attenuator modules 110 and 120 in the low output arrangement and set the beam dump module 130 to be in the laser beam output arrangement, as illustrated in FIG. 10. The laser control unit 41 may control the uniaxial stages 106A and 106C of each of the modules to set the modules in these arrangements.

By setting the modules in these arrangements, the power of the laser beam 30 is reduced by the beam splitters 102A and 102B of each of the attenuator modules 110 and 120. The laser beam 30, of which the power has been reduced, may enter a beam delivery system 34 provided at a later stage as the laser beam 31.

In the case that the attenuator modules 110 and 120 are of the specifications exemplified above, for example, the power of the laser beam 31 which is output from the beam dump apparatus 100 may be 6.7 kW.

In this manner, when adjusting the optical path of the laser beam, a 20 kW laser beam 30 is output from the beam dump apparatus 100 as a 6.7 kW laser beam 31, for example.

5.10 Operation of Beam Dump Apparatus: While Adjusting Output of Laser Beam

Figure 11:
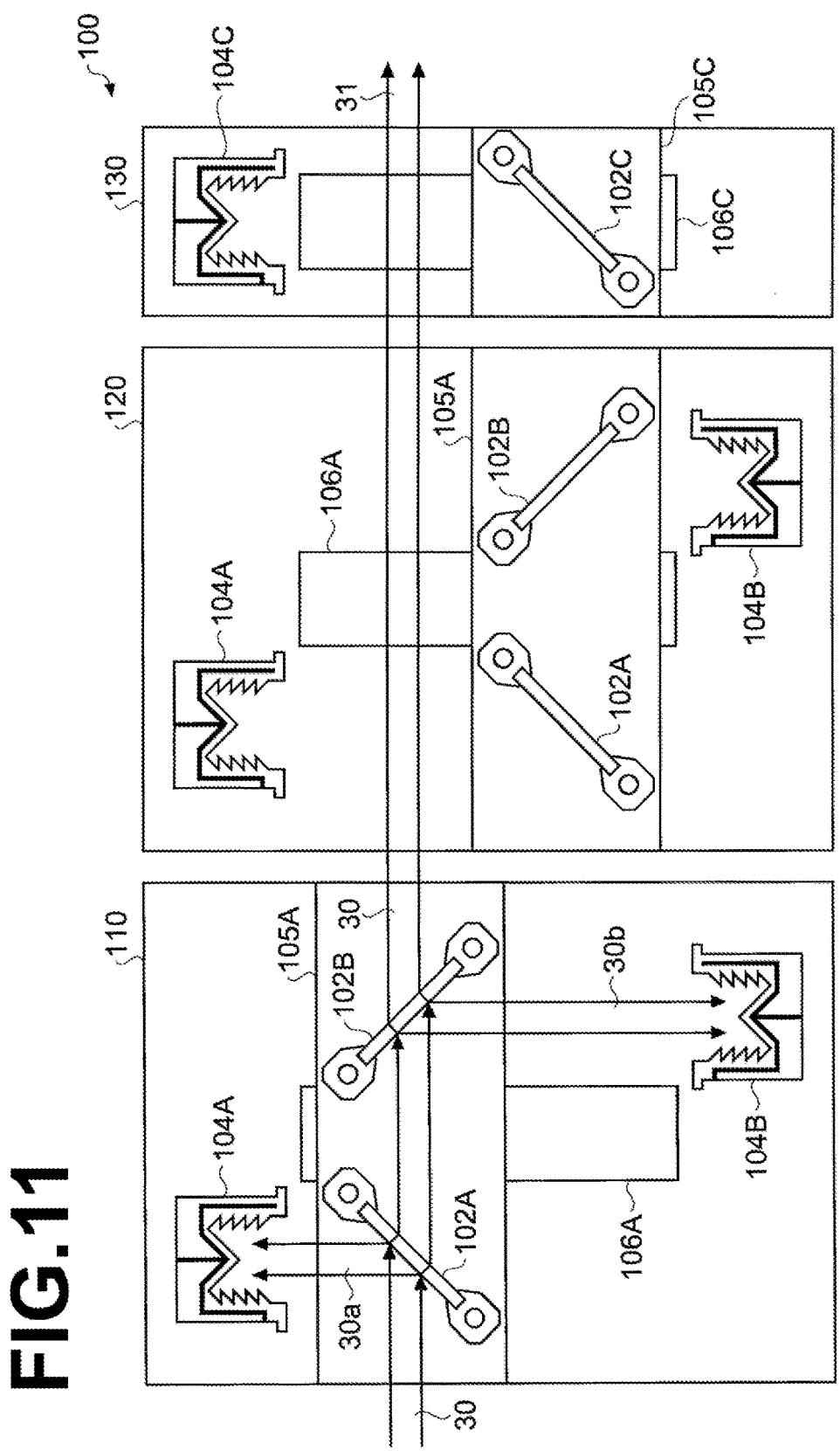
FIG. 11 is another diagram that schematically illustrates an example of the configuration of the beam dump apparatus according to the first embodiment.

FIG. 11 is a diagram that schematically illustrates an example of the arrangements within each module when the power of the laser beam is adjusted employing the beam dump apparatus.

In the operation of adjusting the power of the laser beam, the laser control unit 41 may receive a laser beam output adjustment signal from the EUV light generation control unit 5, for example. The laser beam output adjustment signal may be a signal that commands adjustment (reduction) of the power of the laser beam 31 to be output by the laser apparatus 3. The power after adjustment may be a predetermined power which is specified by the EUV light generation control unit 5. The predetermined power which is specified by the EUV light generation control unit 5 may be 6.7 kW, for example.

In the operation of adjusting the power of the laser beam, the laser control unit 41 may place the attenuator module 110 in the low output arrangement, place the attenuator module 120 in the high output arrangement, and set the beam dump module 130 to be in the laser beam output arrangement, as illustrated in FIG. 11. The laser control unit 41 may control the uniaxial stages 106A and 106C of each of the modules to set the modules in these arrangements.

By setting the modules in these arrangements, the power of the laser beam 30 is reduced by the beam splitters 102A and 102B of each of the attenuator modules 110 and 120. The laser beam 30, of which the power has been reduced, may enter the beam delivery system 34 provided at a later stage as the laser beam 31.

In this manner, when adjusting the power of the laser beam, a 20 kW laser beam 30 is output from the beam dump apparatus 100 as a 6.7 kW laser beam 31, for example.

5.11 Effects

As described above, in the first embodiment, the power of the laser beam 30 is reduced by the plurality of beam splitters 102A and 102B of the attenuator modules 110 and 120. Unnecessary reflected beams which are generated accompanying the reduction in power are distributed among a plurality of beam dumpers. For this reason, the capacity of each of the beam dumpers 104A~104C that receive the reflected beams 30a~30c which are reflected by the beam splitters 102A and 102B and the high reflectance mirror 102C can be small. Thereby, utilization of commercially available beam dumpers, for example, as the beam dumpers 104A~104C becomes possible.

In addition, the even number of beam splitters 102A and 102B in each of the attenuator modules 110 and 120 may be provided such that the incident angles of the laser beam 30 that enters thereinto are crossed. In this case, shifts between the optical axis of the laser beam 30 that enters each of the attenuator modules 110 and 120 and the optical axis of the laser beam 30 which is output from each of the attenuator modules 110 and 120 can be suppressed. Thereby, providing the attenuator modules in multiple steps is facilitated. As a result, arbitrary power reduction rates can be easily realized.

In addition, individual attenuator modules 110 and 120 may select a high output arrangement (without attenuation) and a low output arrangement (with attenuation). For this reason, by controlling the state of arrangement of each of the attenuator modules 110 and 120, the power of the laser beam 31 which is output from the laser apparatus 3 may be adjusted to a desired power. For example, a laser beam 30 having a power of several tens of kW which is output from the final stage amplifier PA3 may be attenuated to a laser beam 31 having a power of several W and output.

In addition, in the first embodiment, the outputs of the master oscillator MO and the amplifiers PA1~PA3 may be the same as the outputs thereof during EUV light output, even during adjustment of the laser beam optical path. For this reason, the thermal load on optical elements from the master oscillator MO through the amplifier PA3 may be equivalent to the thermal load during EUV light output. As a result, the beam divergence and the cross sectional intensity distribution of the laser beam 31 during adjustment of the optical path of the laser beam will be substantially equivalent to those during EUV light output. Thereby, the optical path, etc. of the laser beam 32 during EUV light output can be appropriately adjusted, and irradiation of the target 27 by the laser beam 33 can be stabilized.

In addition, by combining the attenuator modules 110 and 120 and the beam dump module 130, the energy of the reflected beam 30c that enters the beam dumper 104C of the beam dump module 130 can be decreased. Thereby, a beam dumper having a comparatively small capacity may be utilized as the beam dumper 104C, even in cases that a laser beam 30 having a comparatively high energy of approximately several tens of kW is output from the final stage amplifier PA3. As a result, a commercially available beam dumper may be utilized. Further, there is no limit to the number of attenuator modules to be provided. Therefore, the configuration of the first embodiment is easily compatible with increases in the output of the laser apparatus 3. At this time as well, commercially available beam dumpers may be utilized as each of the beam dumpers 104A~104C. Therefore, compatibility with increased output can be achieved at low cost.

5.12 Modification to First Embodiment

Note that in the example described above, each of the attenuator modules 110 and 120 receive input of a 20 kW laser beam 30 and output a 6.7 kW laser beam 30. However, the present disclosure is not limited to such an example. That is, the reflectances of the beam splitters 102A and 102B of each of the attenuator modules 110 and 120 may be selected as appropriate. Further, the number of stages of the attenuator modules 110 and 120 is not limited to the two stages in the example described above. That is, three or more stages of attenuator modules may be provided. The number of stages of attenuator modules and the reflectances of the beam splitters 102A and 102B may be adjusted to configure the beam dump apparatus to be capable of outputting laser beams 31 at several stages of energy.

5.12.1 Alternate Configuration of Beam Dump Apparatus

Figure 12:
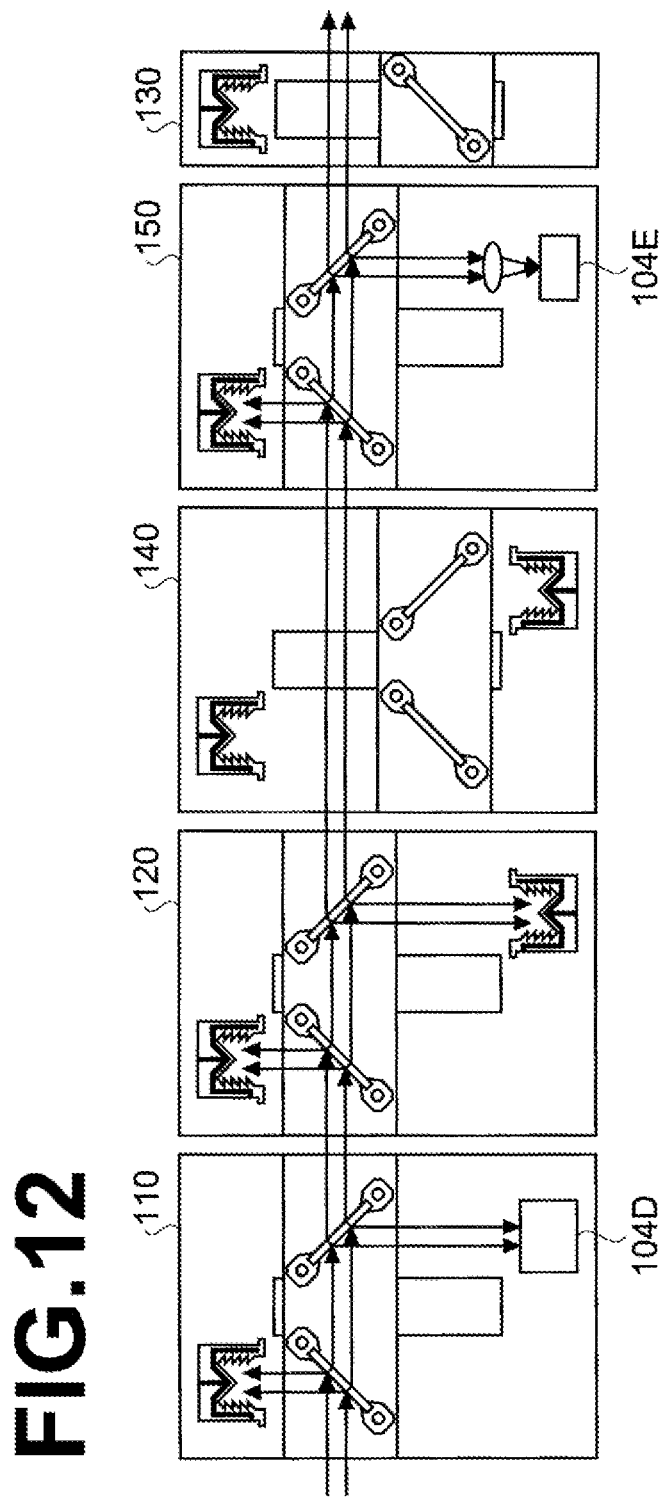
FIG. 12 is a diagram that schematically illustrates an example of a configuration in the case that the number of attenuator modules of the first embodiment is four.

FIG. 12 is a diagram that schematically illustrates an example of a configuration in the case that the number of attenuator modules is four. In the configuration illustrated in FIG. 12, the reflectance of each beam splitter 102A and 102B of each of attenuator modules 110, 120, 140, and 150 may be determined according to a plurality of power values required of the laser beam 31.

In addition, any one of the beam dumpers 104A~104C of each module may be replaced with a power meter, a beam profiler equipped with a collecting optical system, etc. In the example illustrated in FIG. 12, the beam dumper 104B of the attenuator module 110 may be replaced with a power meter 104D. In addition, the beam dumper 104B of the attenuator module 150 may be replaced with a beam profiler 104E. The power meter 104D and the beam profiler 104E may be respectively connected to the laser control unit 41.

5.12.2 Operation of Alternate Configuration of Beam Dump Apparatus

In FIG. 12, the laser control unit 41 may control the uniaxial stage 106A of each of the attenuator modules 110, 120, 140, and 150. Thereby, laser beams 31 of various powers may be output from the beam dump apparatus 100.

In addition, the output signals from the power meter 104D and the beam profiler 104E may be input to the laser control unit 41. The laser control unit 41 may display the value of the power of the laser beam 31 to an operator while adjusting the optical path of the laser beam and while the laser beam is being cut off. The displayed power values may be calculated by the laser control unit 41 based on the output signals from the power meter 104D. At this time, the laser control unit 41 may calculate the power value employing the power reduction rates of the beam splitters 102A and 102B.

Further, the laser control unit 41 may display the profile of the laser beam 31 to the operator while adjusting the optical path of the laser beam and while the laser beam is being cut off. The displayed profile may be calculated by the laser control unit 41 based on the output signals from the beam profiler 104E.

The operator may adjust the optical path of the laser beam 31 based on the displayed power value and the displayed profile. Note that the laser control unit 41 may be equipped with a display for displaying the power value and the profile.

The laser apparatus 3 may be equipped with a mechanism for adjusting the positions and orientations of optical elements which are provided along the optical path of the laser beam 30 from the master oscillator MO through the amplifier PA3. In this case, the laser control unit 41 may control the positions and orientations of the optical elements while adjusting the optical path of the laser beam and while the laser beam is being cut off, based on the output signals from the power meter 104D and the beam profiler 104E.

6. Second Embodiment

Next, a beam dump apparatus according to a second embodiment, as well as a laser apparatus and an EUV light generating apparatus equipped with the beam dump apparatus, will be described in detail with reference to the drawings. In the following description, structures which are the same as those of the embodiment described above will be denoted with the same reference numerals.

6.1 Configuration

Figure 13:
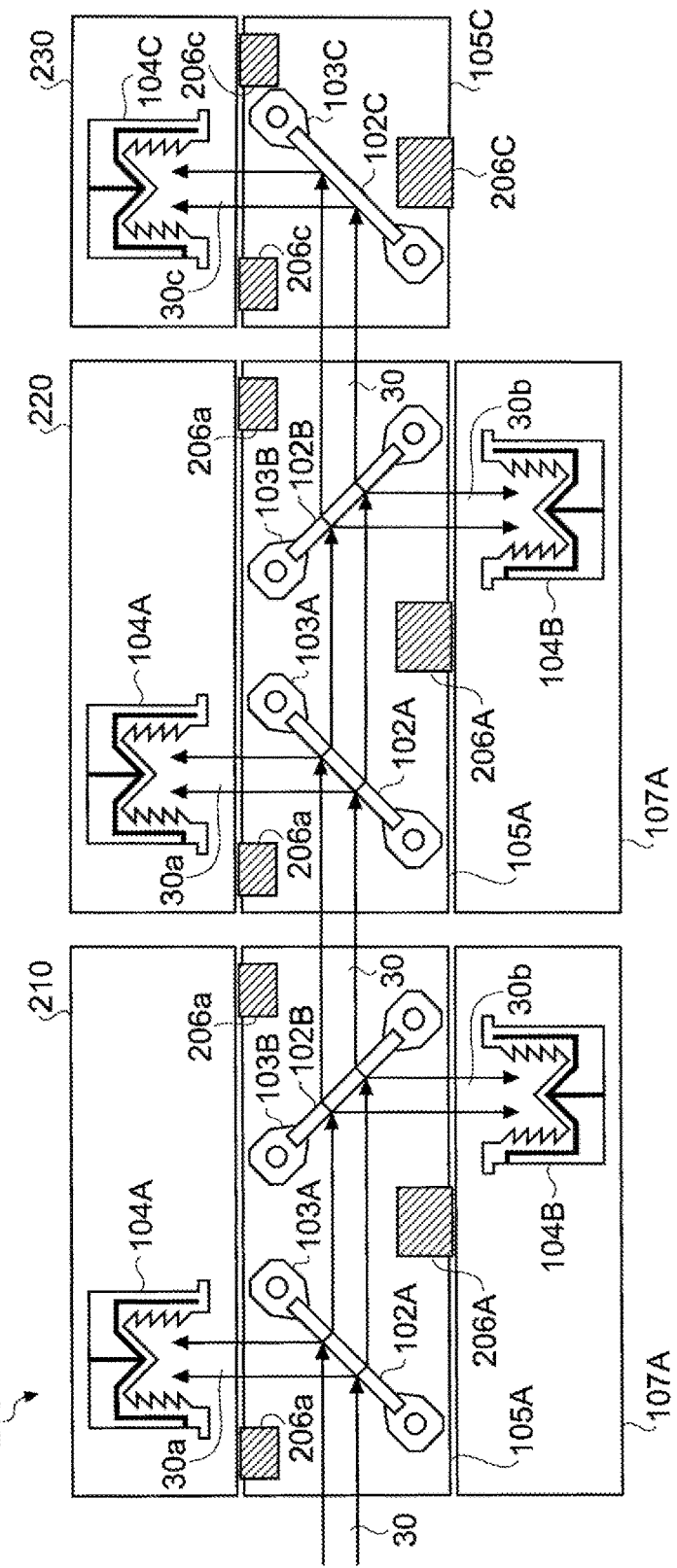
FIG. 13 is a diagram that illustrates an example of the configuration of a beam dump apparatus according to a second embodiment.
Figure 14:
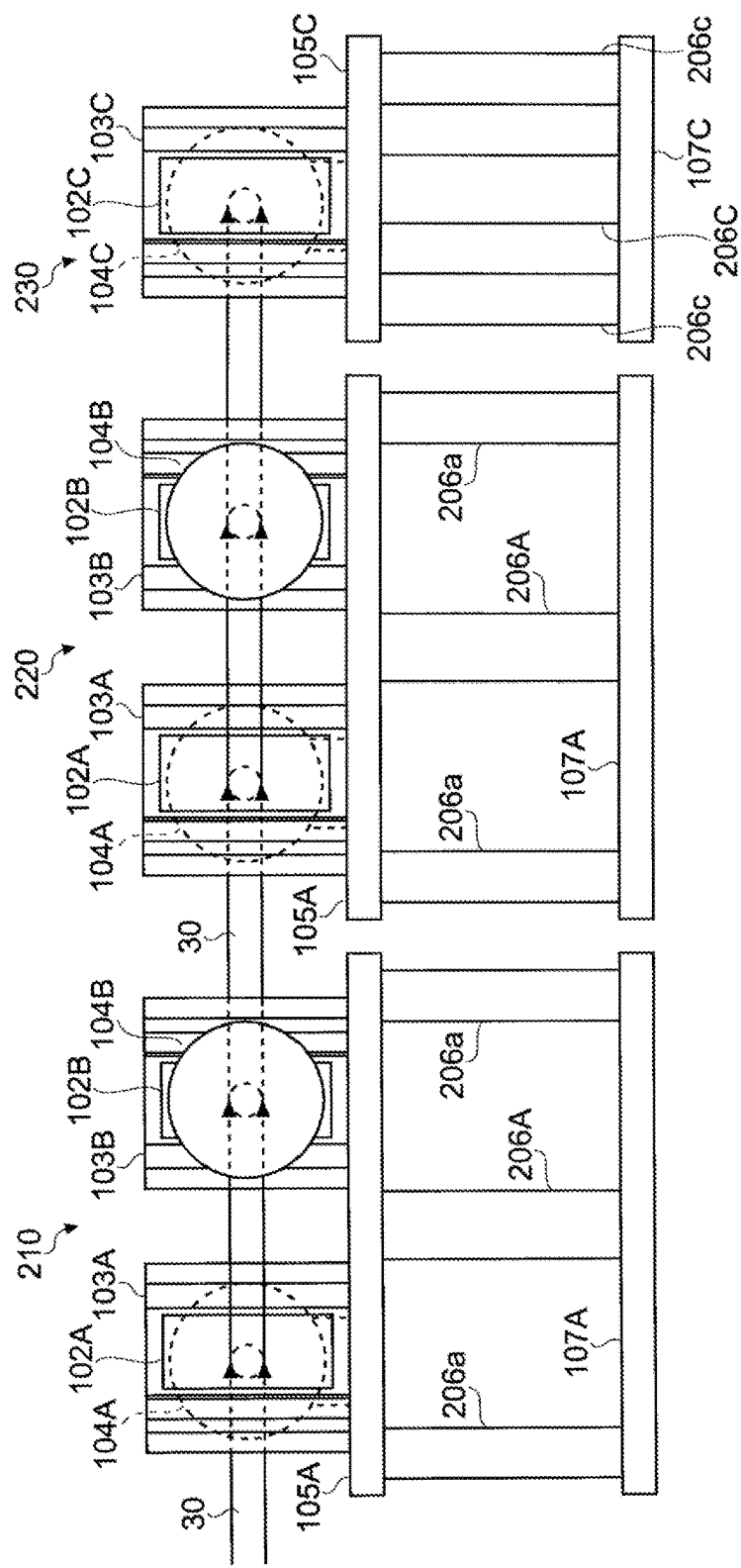
FIG. 14 is another diagram that illustrates an example of the configuration of the beam dump apparatus according to the second embodiment.
Figure 15:
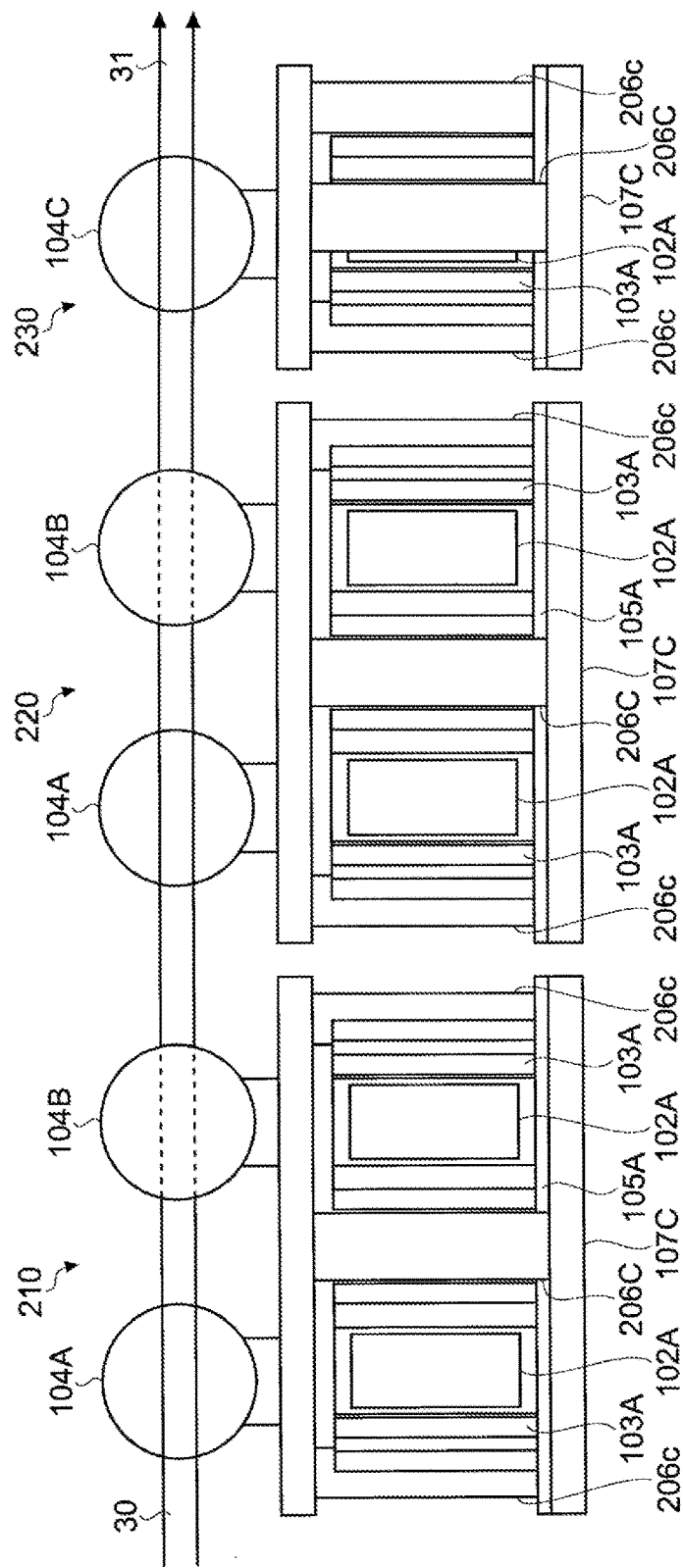
FIG. 15 is another diagram that illustrates an example of the configuration of the beam dump apparatus according to the second embodiment.

FIG. 13 through FIG. 15 are diagrams that schematically illustrate examples of the configuration of the beam dump apparatus according to the second embodiment. FIG. 13 is a plan view of a beam dump apparatus 200. FIG. 14 and FIG. 15 are side views of the beam dump apparatus 200. Note that FIG. 13 and FIG. 14 are diagrams that schematically illustrate examples of the arrangements within each module when a laser beam is being cut off. FIG. 15 is a diagram that schematically illustrates an example of the arrangements within each module when the laser beam is being output (during output of EUV light, for example).

As illustrated in FIG. 13 through FIG. 15, the beam dump apparatus 200 may include one or more attenuator modules 210 and 220, and a beam dump module 230.

Uniaxial stages 206A and 206C of each of the modules may be respectively fixed to a base plate 107A or 107C. Each of the uniaxial stages 206A and 206C may move a movable plate 105A or 105C with respect to the base plate 107A or 107C in directions different from those of the first embodiment. For example, the uniaxial stages 206A and 206C may respectively move the movable plates 105A and 105C in a direction of movement perpendicular to the optical element mounting planes of the base plates 107A and 107C, as illustrated in FIG. 14 and FIG. 15. This direction of movement may be the direction of gravity.

Each of the movable plates 105A and 105C may be guided by linear guides 206a and 206c that extend in directions parallel to the direction of movement of the uniaxial stages 206A and 206C.

6.2 Operation

While the laser beam is being cut off, the laser control unit 41 may place the movable plates 105A of each of the attenuator modules 210 and 220 in a low output arrangement (first position), and place the movable plate 105C of the beam dump module 230 in a laser beam cutoff arrangement (third position), as illustrated in FIG. 13 and FIG. 14.

In addition, during laser beam output, the laser control unit 41 may place the movable plates 105A of each of the attenuator modules 210 ad 220 in a high output arrangement (second position), and place the movable plate 105C of the beam dump module 230 in a laser beam output arrangement (fourth position), as illustrated in FIG. 15.

The linear guides 206a and 206c of each module may regulate the movements of the movable plates 105A and 105C such that the movable plates 105A and 105C translate in the directions of movement. Thereby, the angles of the optical element mounting planes of the movable plates 105A and 105C with respect to the angles of the optical element mounting planes of the base plates 107A and 107C may be maintained prior to and following movement of the movable plates 105A and 105C.

The other configurations, operations, and effects may be the same as those of the embodiment described above.

7. Third Embodiment

Next, a beam dump apparatus according to a third embodiment, as well as a laser apparatus and an EUV light generating apparatus equipped with the beam dump apparatus, will be described in detail with reference to the drawings. In the following description, structures which are the same as those of the embodiments described above will be denoted with the same reference numerals.

7.1 Configuration

Figure 16:
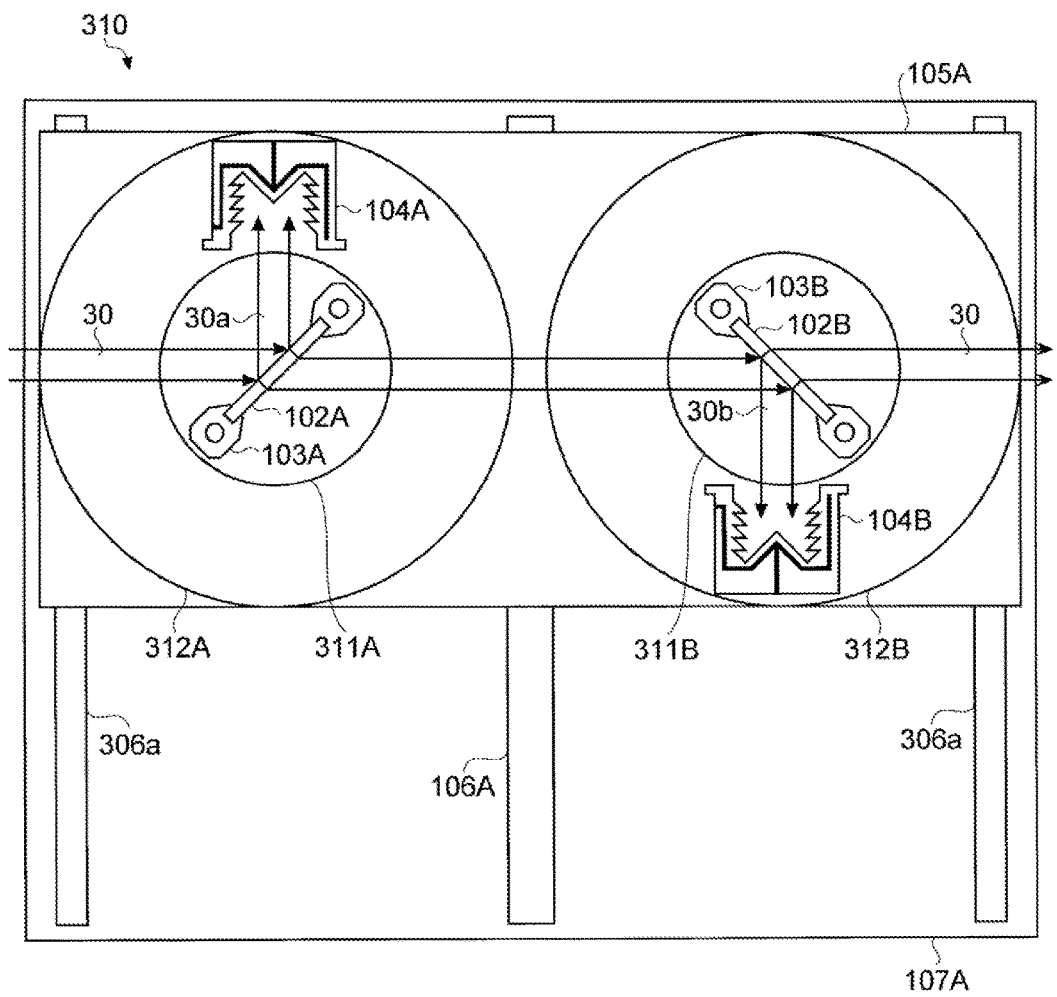
FIG. 16 is a diagram that illustrates an example of the configuration of an attenuator module according to a third embodiment.
Figure 17:
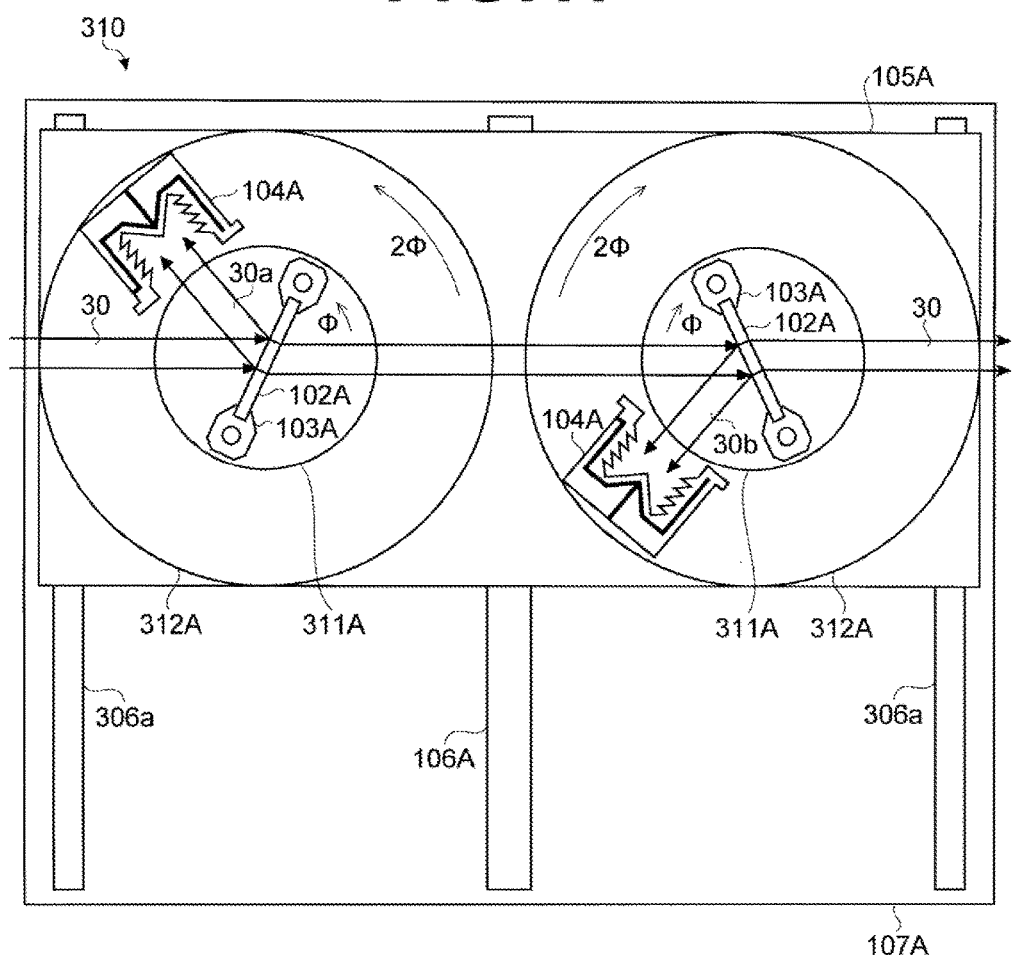
FIG. 17 is another diagram that illustrates an example of the configuration of the attenuator module according to the third embodiment.

FIG. 16 and FIG. 17 are diagrams that schematically illustrate examples of the configuration of an attenuator module according to the third embodiment. At least one of the plurality of attenuator modules which are mounted within the beam dump apparatus 100 may be replaced with the attenuator module 310 illustrated in FIG. 16. The attenuator module 310 may be capable of continuously changing the power of the laser beam 30 which is output therefrom.

As illustrated in FIG. 16 and FIG. 17, the attenuator module 310 may be equipped with two inner rotatable stages 311A and 311B and two outer rotatable stages 312A and 312B, in addition to the beam splitters 102A and 102B and the beam dumpers 104A and 104B. The inner rotatable stages 311A and 311B and the outer rotatable stages 312A and 312B may be mounted on the movable plate 105A. The movable plate 105A may be capable of being moved between a low output arrangement (first position) and a high output arrangement (second position) by a uniaxial stage 106A, which is the same as that of the first embodiment. The movement of the movable plate 105A may be guided by linear guides 306a that extend in a direction parallel to the direction of movement of the uniaxial stage 106A.

The inner rotatable stage 311A may be rotatable about a rotational axis that passes through the center thereof. The beam splitter 102A may be fixed to the inner rotatable stage 311A employing the splitter holder 103A. At this time, the beam splitter 102A may be fixed to the inner rotatable stage 311A such that the rotational axis of the inner rotatable stage 311A is positioned at the plane of the beam splitter 102A into which the laser beam 30 enters. The beam splitter 102B and the inner rotatable stage 311B may be of the same configuration.

The outer rotatable stage 312A may be rotatable about the same rotational axis as that of the inner rotatable stage 311A. The outer rotatable stage 312A may be of a discoid shape or an annular shape. In the case that the outer rotatable stage 312A is of an annular shape, the inner rotatable stage 311A may be accommodated within the aperture at the center of the outer rotatable stage 312A to be rotatable therein. The beam dumper 104A may be fixed to the outer rotatable stage 312A at a position toward exterior of the inner rotatable stage 311A. The beam dumper 104B and the outer rotatable stage 312B may be of the same configuration.

Each of the inner rotatable stages 311A and 311B as well as each of the outer rotatable stages 312A and 312B may be respectively connected to the laser control unit 41.

As illustrated in FIG. 17, the outer rotatable stage 312A may be configured to rotate for a rotational angle of $2\varphi$, which is twice a rotational angle $\varphi$ of the inner rotational stage 311A. This may be realized by control exerted by the laser control unit 41, or may be realized by a gear ratio between a gear that rotates the inner rotatable stage 311A and a gear that rotates the outer rotatable stage 312A. The inner rotatable stage 311B and the outer rotatable stage 312B may be of the same configuration.

In addition, the inner rotatable stage 311B may be configured to rotate in a direction reverse to that of the rotational direction of the inner rotatable stage 311A. For example, the inner rotatable stage 311B may rotate for an angle of $-\varphi$ in the case that the inner rotatable stage 311A rotates for an angle of $\varphi$. This may be realized by control exerted by the laser control unit 41, or may be realized by the gear that rotates the inner rotatable stage 311A and a gear that rotates the inner rotatable stage 311B.

7.2 Operation

When adjusting the optical path of the laser beam and when adjusting the output of the laser beam, the laser control unit 41 may place the movable plate 105A of the attenuator module 310 in the low output arrangement (first position), as illustrated in FIG. 16.

In addition, the laser control unit 41 may control the inner rotatable stages 311A and 311B to change the incident angles of the laser beam 30 with respect to the beam splitters 102A and 102B, as illustrated in FIG. 17. At this time, the beam splitter 102A may rotate for an angle of $\varphi$ and the beam splitter 102B may rotate for an angle of $-\varphi$. By changing the incident angles of the laser beam 30 with respect to the beam splitters 102A and 102B, the reflectance and transmissivity of each of the beam splitters 102A and 102B are changed.

In addition, the outer rotatable stages 312A and 312B may rotate for the doubled rotational angles $2\varphi$ and $-2\varphi$, accompanying the rotation of the inner rotatable stages 311A and 311B. Thereby, the arrangements of the beam dumpers 104A and 104B are changed such that reflected light beams 30a and 30b which are reflected by the beam splitters 102A and 102B enter the beam dumpers 104A and 104B.

7.3 Effects

By being equipped with the configurations described above, the power of the laser beam 30 which is output from the attenuator module 310 can be continuously and arbitrarily changed. Thereby, the output of the laser apparatus 3 can be continuously and arbitrarily changed.

The other configurations, operations, and effects may be the same as those of the embodiments described above.

Figure 18:
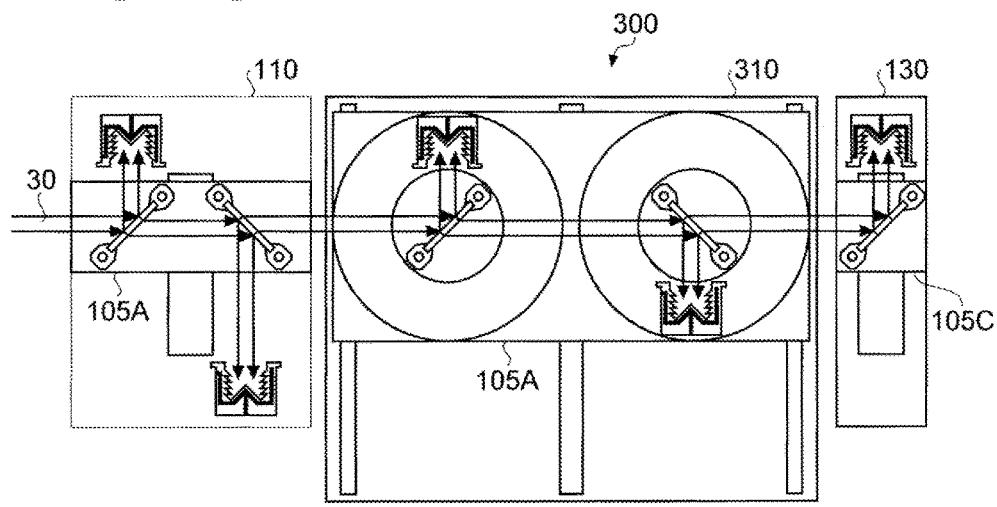
FIG. 18 is a diagram that illustrates an example of the configuration of a beam dump apparatus according to the third embodiment.
Figure 19:
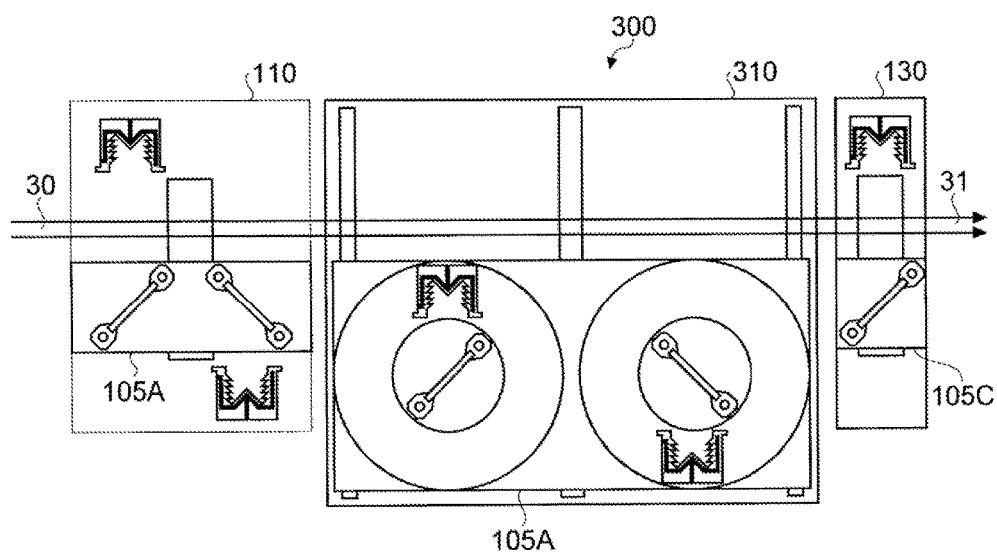
FIG. 19 is another diagram that illustrates an example of the configuration of the beam dump apparatus according to the third embodiment.

In addition, as described above, at least one of the plurality of attenuator modules (the attenuator module 120, for example) which are mounted within the beam dump apparatus 100 may be replaced with the attenuator module 310, as illustrated in FIG. 18 and FIG. 19.

In this case, when the laser beam is to be cut off, the laser control unit 41 may place the movement plate 105A of each of the attenuator modules 110 and 310 in the low output arrangement (first position) and place the movable plate 105B of the beam dump module 130 in the laser beam cutoff arrangement (third position), as illustrated in FIG. 18.

In addition, when the laser beam is to be output, the laser control unit 41 may place the movement plate 105A of each of the attenuator modules 110 and 310 in the high output arrangement (second position) and place the movable plate 105B of the beam dump module 130 in the laser beam output arrangement (fourth position), as illustrated in FIG. 19.

Note that when adjusting the optical path of the laser beam and when adjusting the output of the laser beam, the attenuator module 310 may be set in the low output arrangement, and the incident angles θ1 and θ2 of each of the beam splitters 102A and 102B with respect to the laser beam 30 may be adjusted, as illustrated in FIG. 17. Thereby, the power of the laser beam 30 which is output from the attenuator module 310 can be continuously and arbitrarily changed.

8. Fourth Embodiment

Next, a beam dump apparatus according to a fourth embodiment, as well as a laser apparatus and an EUV light generating apparatus equipped with the beam dump apparatus, will be described in detail with reference to the drawings. In the following description, structures which are the same as those of the embodiments described above will be denoted with the same reference numerals.

8.1 Configuration

Figure 20:
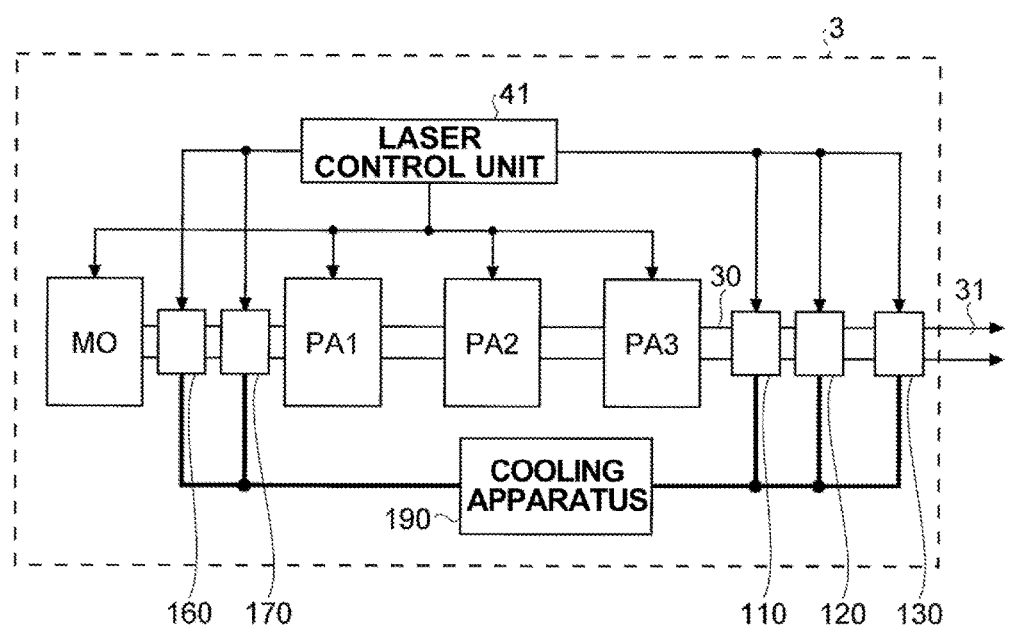
FIG. 20 is a diagram that schematically illustrates an example of the configuration of a laser apparatus according to a fourth embodiment.

FIG. 20 is a diagram that schematically illustrates an example of the configuration of a laser apparatus according to the fourth embodiment. The locations at which the attenuator modules and beam dump modules which have been described as examples in the above embodiments are not limited to the output stage of the laser apparatus 3. That is, one or more attenuator modules 140 and/or a beam dump module 150 may be provided along the optical path from the master oscillator MO to the amplifier PA3. For example, an attenuator module 160 and a beam dump module 170 may be provided between the master oscillator MO and the amplifier PA1, as illustrated in FIG. 20. In addition, the one or more attenuator modules to be provided may be any of the attenuator modules 110, 120, 210, 220, and 310 described above.

8.2 Operation

In the configuration exemplified in FIG. 20, when the laser beam is to be output, the laser control unit 41 may place the movable plate 105A of the attenuator module 160 in a high output arrangement (second position), and place the movable plate 105C of the beam dump module 170 in a laser beam output arrangement (fourth position). However, in the case that the attenuator module 310 is employed as the attenuator module 160, the laser control unit 41 may adjust the output from the laser apparatus 3 by placing the movable plate 105A in the low output arrangement (first position) and by adjusting the rotational angles of each of the rotatable stages.

In addition, when the laser beam is to be cut off, the laser control unit 41 may place the movable plate 105A of the attenuator module 160 in a low output arrangement (first position), and place the movable plate 105C of the beam dump module 170 in a laser beam cutoff arrangement (third position).

8.3 Effects

For example, in the case that a semiconductor laser such as a quantum cascade laser (QCL) is employed as the master oscillator MO, the thermal load on the semiconductor laser will change if the output energy of the master oscillator MO is changed. Thereby, the oscillating wavelength of the master oscillator MO may change. In contrast, according to the configuration of the fourth embodiment, the master oscillator MO is capable of always being oscillated at a constant energy. Therefore, changes in the oscillating wavelength of the master oscillator MO can be suppressed.

The other configurations, operations, and effects may be the same as those of the embodiments described above.

9. Fifth Embodiment

Next, a beam dump apparatus according to a fifth embodiment, as well as a laser apparatus and an EUV light generating apparatus equipped with the beam dump apparatus, will be described in detail with reference to the drawings. The fifth embodiment will be described as an example of a beam dump apparatus to be mounted on the chamber 2 of FIG. 2. In the following description, structures which are the same as those of the embodiments described above will be denoted with the same reference numerals.

9.1 Configuration

Figure 21:
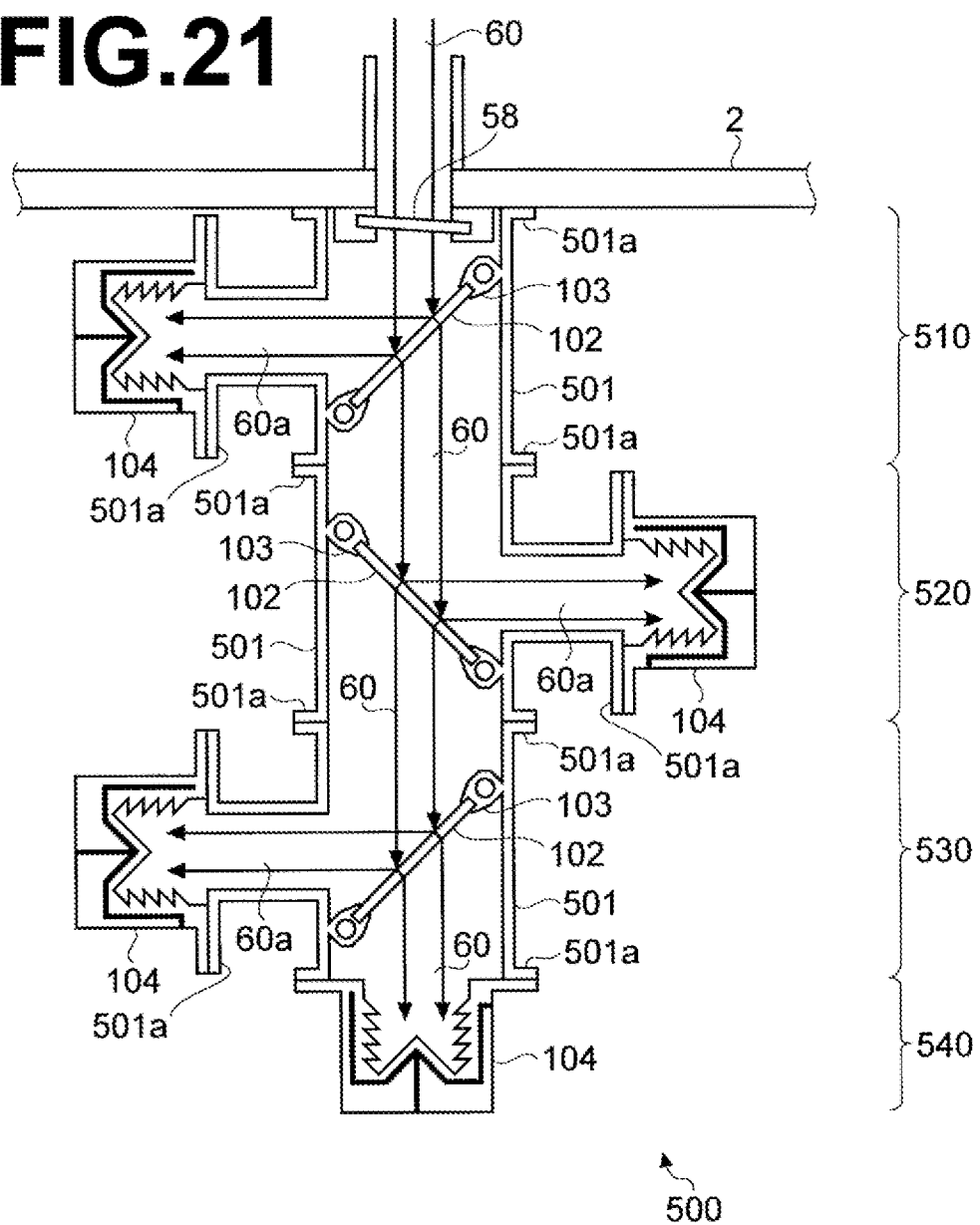
FIG. 21 is a diagram that schematically illustrates an example of the configuration of a beam dump apparatus according to a fifth embodiment.

FIG. 21 is a diagram that schematically illustrates an example of the configuration of a beam dump apparatus according to the fifth embodiment. The beam dump apparatus 500 may be equipped with one or more beam dump modules 510~530. The beam dump apparatus 500 may also be equipped with a final end module 540.

Each of the beam dump modules 510530 may be equipped with a frame 501, a beam splitter 502, and a beam dumper 104.

Figure 22:
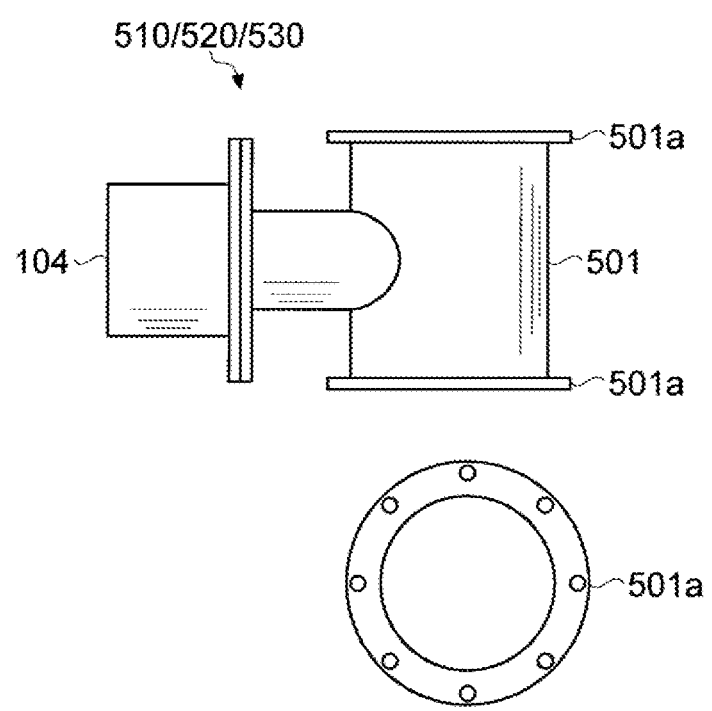
FIG. 22 is a diagram that schematically illustrates an example of the configuration of a frame according to the fifth embodiment.

As illustrated in FIG. 22, the frame 501 may be a T pipe joint shaped member formed by metal or the like. The frame 501 may be equipped with a connecting flange 501a at each of its three open ends. The sizes of the connecting flanges 501a at the three open ends may be the same or may be different. However, it is preferable for the connecting flanges 501a to be the same size as one of the connecting flanges of other frames 501, even in the case that the sizes of the connecting flanges 501a are different.

Each of the connecting flanges 501a may have a plurality of bolt holes therein. The bolt hole diameters and the pitches among the bolt holes may be the same among connecting flanges 501a of the same size.

The connecting flanges 501a may be ConFlat flanges. It is possible to connect ConFlat flanges to each other employing metal packings. For this reason, the gastight properties within the beam dump apparatus 500 can be secured by employing ConFlat flanges as the connecting flanges 501a. In this case, it is not necessary for the chamber 2 to be equipped with the dumper window 58.

The three connecting flanges 501a may each define an opening through which a laser beam 60 may enter and exit. Among the three openings, one may be employed as an input opening through which the laser beam 60 enters into the beam dump module 510, 520, or 530. Another one of the three openings may be employed as an output opening, through which the laser beam 60 exits the beam dump module 510, 520, or 530. The remaining one of the three openings may be a mounting opening onto which the beam dumper 104 is mounted.

A splitter holder 503 that holds the beam splitter 502 may be provided within the frame 501. Channels, through which a cooling medium flows, may be provided in the interior of the splitter holder 503.

The splitter holder 503 may hold the beam splitter 502 at a position and an angle such that the a reflected beam 60a of the laser beam 60 that enters through the input opening propagates toward the mounting opening or the output opening, and the laser beam 60 which is transmitted through the beam splitter 502 propagates toward the output opening or the mounting opening. FIG. 21 illustrates an example of a configuration in which the reflected beam 60a propagates toward the mounting opening, and the laser beam 60 which is transmitted through the beam splitter 502 propagates toward the output opening.

An optical substrate that exhibits high transmissivity with respect to the wavelength of a laser beam which is output from a $CO_2$ laser may be employed as the beam splitter 502. A coating for adjusting reflectance may be administered on the surface of the optical substrate. Alternatively, the beam splitter 502 may be an uncoated ZnSe plane parallel substrate. In this case, the reflectance will be approximately 20% in the case that a laser beam output from a $CO_2$ enters the beam splitter 502 at an incident angle of 45°.

The beam dumper 104 may be the same as the beam dumpers 104A~104C described above. Accordingly, a commercially available beam dumper may be employed as the beam dumper 104. In this case, a dedicated or an appropriate adapter may be employed to mount the beam dumper 104 to the connecting flange 501a. In addition, the channels within the beam dumper 104 may be connected to the cooling apparatus 590.

The final end module 540 may be the beam dumper 104. A dedicated or an appropriate adapter may be employed to mount the final end module 540 to the connecting flange 501a. Alternatively, a beam dumper different from the beam dumper 104 may be employed as the final end module 540.

In addition, the final end module 540 may be a lid member that seals the output opening of the frame 501 instead of the beam dumper 104. In this case, in the example illustrated in FIG. 21, the reflectance of the beam splitter 502 within the beam dump module 530 to which the final end module 540 is connected may be approximately 100%. However, in the case that the mounting position of the beam dumper 104 and the final end module 540 (lid member) in the beam dump module 530 illustrated in FIG. 21 are switched, the beam splitter 502 within the frame 501 may be omitted.

The one or more beam dump modules 510~530 may be linearly connected in a single row. The beam dump module 510 which is positioned at one end of the row may be connected to the chamber 2. The final end module 540 described above may be connected to the beam dump module 530 at the other end of the row. In addition, the beam dump modules 510~530 which are connected in a single row may be provided such that the connecting flanges 501a thereof which are utilized as mounting openings alternately face opposite directions. The connections between the beam dump module 510 and 520, between the beam dump modules 520 and 530, and between the beam dump module 530 and the final end module 540 may be fastening by bolts and nuts.

Here, in the case that the energy of the laser beam 60 that enters the beam dump apparatus 500 is 10 kW, the specifications of the beam splitters 102 and the beam dumpers 104 of the beam dump modules 510~530 and the specifications of the beam dumper 104 that constitutes the final end module 540 may be as follows.

Beam Dump Module 510
Beam Splitter 102: Reflectance=25%
Beam Dumper 104: Capacity=3 kW
Beam Dump Module 520
Beam Splitter 102: Reflectance=33%
Beam Dumper 104: Capacity=3 kW
Beam Dump Module 530
Beam Splitter 102: Reflectance=50%
Beam Dumper 104: Capacity=3 kW
Final End Module 540
Beam Dumper 104: Capacity=3 kW In the case that the specifications are as those listed above, the energies of the laser beams 60 and 60a which are absorbed by each of the beam dumpers 104 can be estimated to be as follows.

Beam Dumper 104 of Beam Dump Module 510: 2.50 kW
Beam Dumper 104 of Beam Dump Module 520: 2.47 kW
Beam Dumper 104 of Beam Dump Module 530: 2.51 kW
Beam Dumper 104 of Final End Module 540: 2.51 kW A substantially equal amount of energy is absorbed by the four beam dumpers 104 as described above. Note that the specifications listed above are merely one example, but that beam dumpers having common specifications may be utilized as each of the beam dumpers 104, by selecting the reflectances of the beam splitters 102 as appropriate. In addition, the reflectances of the beam splitters 102 may be higher for beam splitters 102 which are positioned toward the downstream side along the propagation path of the laser beam 60.

9.2 Operation

The laser beam 60 which is reflected by the dumper mirror 57 within the chamber 2 may enter the beam dump module 510 at the first stage of the beam dump apparatus 500, via the dumper window 58.

A portion of the laser beam 60 that enters the beam dump module 510 may be reflected by the beam splitter 502 as the reflected beam 60a. The reflected beam 60a may enter the beam dumper 104 which is mounted on the connecting flange 501a which is the mounting opening. A portion of the reflected beam 60a that enters the beam dumper 104 may be absorbed by the cone portion 104c (refer to FIG. 4). The remaining portion of the reflected beam 60a may be diffused and absorbed by the corrugated portion 104b.

Meanwhile, the laser beam 60, of which the power has been reduced as it was transmitted through the beam splitter 102, may enter the next stage beam dump module 520 via the output opening of the beam dump module 510.

The power of the laser beam 60 may be reduced, by sequentially passing through the beam dump modules 510~530 in the manner described above. In addition, the laser beam 60 which is output from the output opening of the final stage beam dump module 530 may enter the final end module 540, and may be absorbed by the cone portion 104c and the corrugated portion 104b thereof.

9.3 Effects

According to the fifth embodiment, the beam dump apparatus 500 can be mounted onto the chamber 2 by securing an area corresponding to one beam dump module on the outer wall of the chamber 2. In addition, a high capacity beam dump apparatus 500 can be easily realized. That is, providing additional beam dump modules according to the energy of the laser beam 60 is facilitated.

Further, beam dumpers having specifications in common can be utilized in a plurality of beam dump modules, by selecting the reflectance of the beam splitter within each beam dump module. This suggests that commercially available beam dumpers can be utilized. Thereby, the costs for developing and producing a dedicated high capacity beam dump apparatus 1000 or 5000 can be obviated, and an increase in apparatus cost can be suppressed.

Still further, in the case that a plurality of beam dump modules are arrayed in series, by arranging the beam dump modules such that the mounting openings thereof alternately face opposite directions, the total dimensions of the beam dump apparatus 500 can be decreased. Still yet further, shifting of the optical path of the laser beam 60 within the beam dump apparatus 500 can be suppressed by this arrangement. As a result, providing additional beam dump modules is facilitated.

Note that the laser beam 60 which is scattered by components within the beam dump apparatus 500 are absorbed by the inner walls of the frames 501, and therefore leakage of the laser beam 60 to the exterior can be suppressed.

In addition, each of the beam dumpers 104 and each of the beam splitters 102 are directly or indirectly cooled. Therefore, damage can be suppressed over a long period of time.

The other configurations, operations, and effects may be the same as those of the embodiments described above.

9.4 First Modification to the Fifth Embodiment

The fifth embodiment was described above as an example in which the energy of the laser beam 60 that enters the beam dump apparatus 500 is 10 kW. In contrast, a first modification will be described as an example of a case in which the energy of the laser beam 60 that enters the beam dump apparatus 500 is 20 kW.

9.4.1 Configuration

Figure 23:
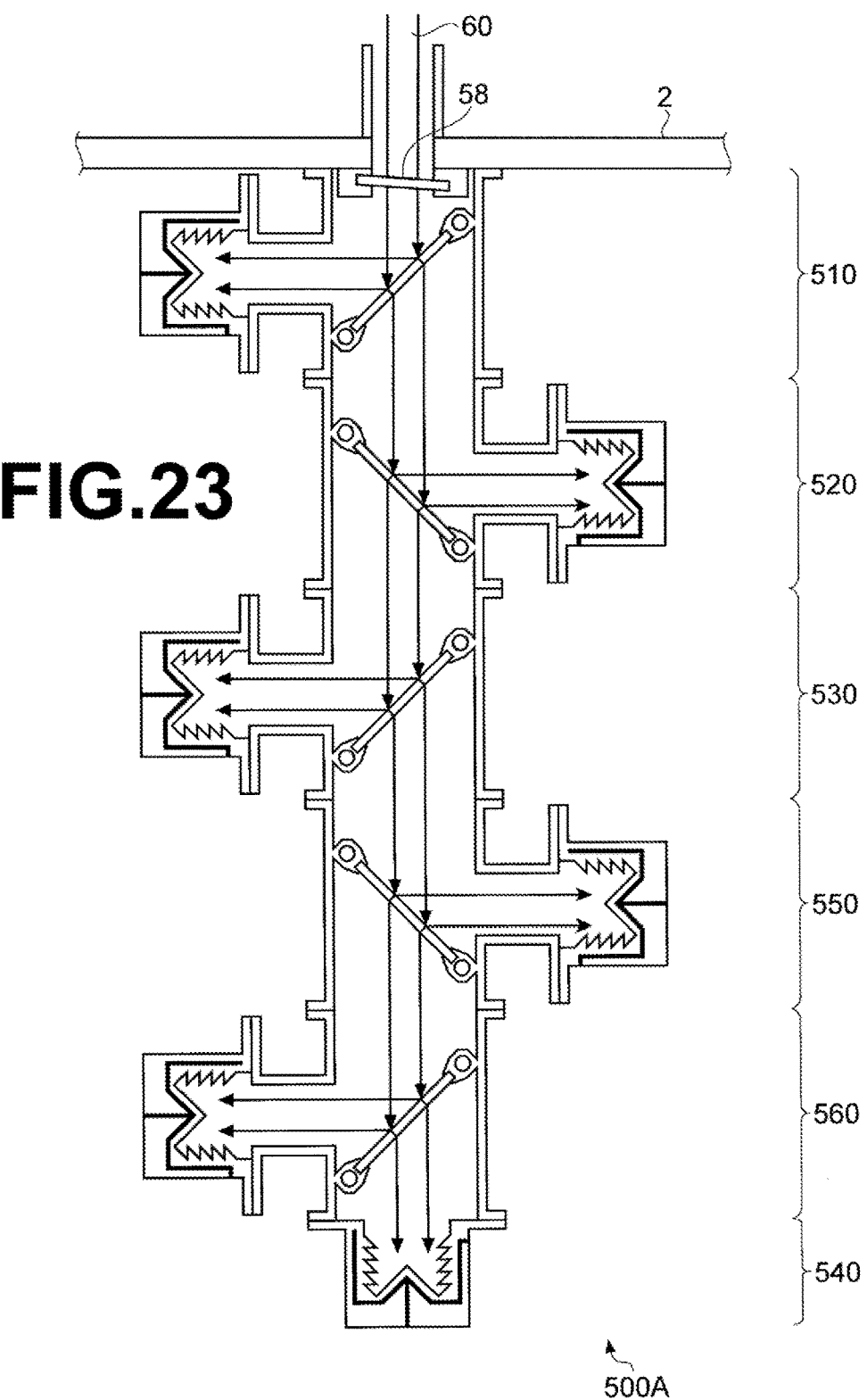
FIG. 23 is a diagram that schematically illustrates an example of the configuration of a first modification to the beam dump apparatus according to the fifth embodiment.

FIG. 23 is a diagram that schematically illustrates an example of the configuration of a beam dump apparatus according to the first modification. As illustrated in FIG. 23, the beam dump apparatus 500A may be equipped with beam dump modules 550 and 560 in addition to the same structures as those of the beam dump apparatus 500. That is, the beam dump apparatus 500A may be of a configuration in which the beam dump apparatus 500 is additionally provided with the two beam dump modules 550 and 560.

It is not necessary for the beam dumpers 104 of the beam dump modules 510~530, 550, and 560 to have common specifications. For example, the capacities of the beam dumpers 104 at the later stages may be greater than those of earlier stages. If the energy of the laser beam 60 that enters the beam dump apparatus 500A is set to 20 kW, the specifications of the beam splitters 102 and the beam dumpers 104 of the beam dump modules 510~530, 550 and 560, and the specifications of the beam dumper 104 that constitutes the final end module 540 may be as follows.

Beam Dump Module 510
Beam Splitter 102: Reflectance=12%
Beam Dumper 104: Capacity=3 kW
Beam Dump Module 520
Beam Splitter 102: Reflectance=15%
Beam Dumper 104: Capacity=3 kW
Beam Dump Module 530
Beam Splitter 102: Reflectance=25%
Beam Dumper 104: Capacity=5 kW
Beam Dump Module 550
Beam Splitter 102: Reflectance=33%
Beam Dumper 104: Capacity=5 kW
Beam Dump Module 560
Beam Splitter 102: Reflectance=50%
Beam Dumper 104: Capacity=5 kW
Final End Module 540
Beam Dumper 104: Capacity=5 kW In the case that the specifications are as those listed above, the energies of the laser beams 60 and 60a which are absorbed by each of the beam dumpers 104 can be estimated to be as follows.

Beam Dumper 104 of Beam Dump Module 510: 2.40 kW
Beam Dumper 104 of Beam Dump Module 520: 2.64 kW
Beam Dumper 104 of Beam Dump Module 530: 3.74 kW
Beam Dumper 104 of Beam Dump Module 550: 3.70 kW
Beam Dumper 104 of Beam Dump Module 560: 2.51 kW
Beam Dumper 104 of Final End Module: 2.51 kW As described above, the specifications of the beam dumpers 104 of the two early stage beam dump modules 510 and 520 may be the same. In addition, the specifications of the beam dumpers 104 of the three later stage beam dump modules 530, 550, and 560 may be the same. Note that commercially available beam dumpers may be utilized as the 3 kW capacity and 5 kW capacity beam dumpers 104. In this manner, the beam dumpers 104 positioned more toward the downstream side along the propagation path of the laser beam 60 may be higher capacity beam dumpers. In addition, beam dumpers 104 positioned more toward the upstream side along the propagation path of the laser beam 60 may be lower capacity beam dumpers.

9.4.2 Effects

The capacity of the beam dump apparatus 500A can be increased without increasing the installation area on the chamber 2 for the beam dump apparatus 500A, by employing higher capacity beam dumpers as the beam dumpers 104 which are positioned at the downstream side along the propagation path of the laser beam 60 as described above. In addition, the amount of space which is occupied by the beam dump apparatus 500A in the vicinity of the chamber 2 can be reduced, by employing lower capacity beam dumpers as the beam dumpers 104 which are positioned at the upstream side along the propagation path of the laser beam 60.

9.5 Second Modification to the Fifth Embodiment

The fifth embodiment was described above as an example of a case in which the beam dump modules 510~530 are arranged in series. In contrast, the second modification will be described as an example in which the beam dump modules 510~530 are in a different arrangement.

9.5.1 Configuration

Figure 24:
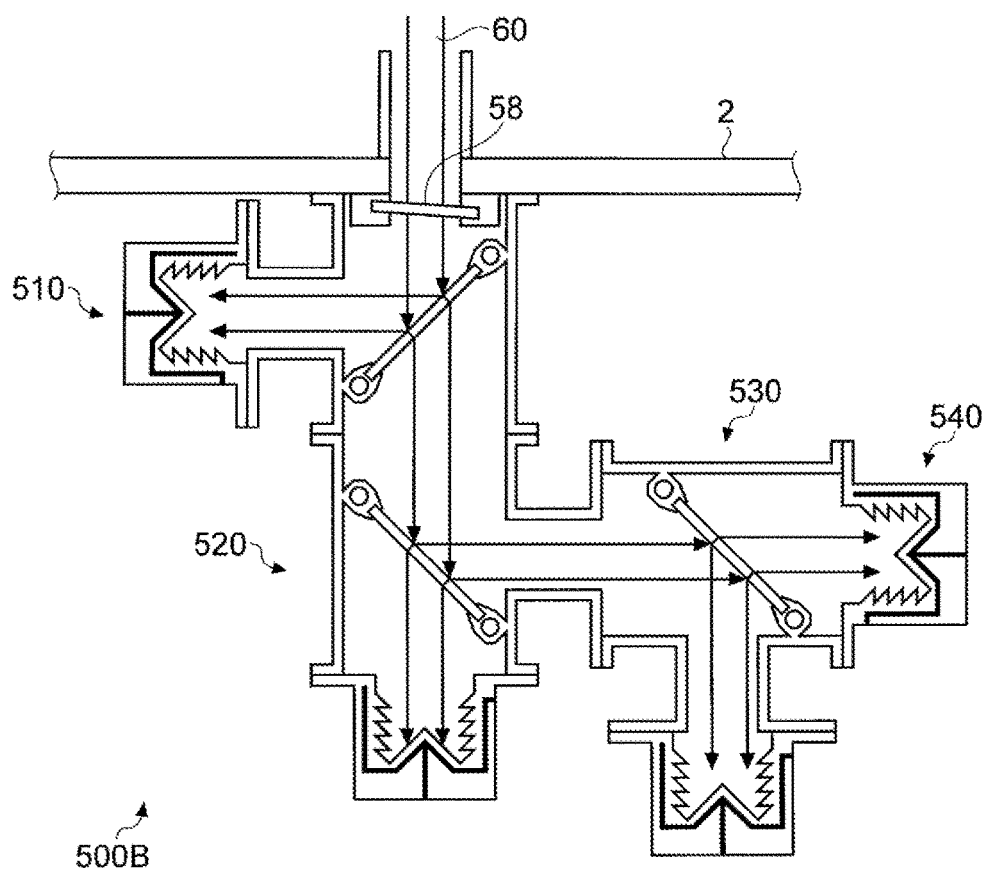
FIG. 24 is a diagram that schematically illustrates an example of the configuration of a second modification to the beam dump apparatus according to the fifth embodiment.

FIG. 24 is a diagram that schematically illustrates an example of the configuration of a beam dump apparatus according to the second modification. As illustrated in FIG. 24, the beam dump apparatus 500B may be equipped with beam dump modules 510~530 and a final end module 540, similarly to the beam dump apparatus 500. However, in the beam dump apparatus 500B, the beam dump modules 510~530 may be arranged in a bent L shape.

In addition, all of the plurality of connecting flanges 501a of each of the beam dump modules 510~530 may be of the same size and have the same specifications (the arrangements and diameters of bolt holes, etc.).

9.5.2 Effects

As described above, the plurality of beam dump modules may be connected in various arrangements, which are not limited to linear arrangements. At this time, the degree of freedom in arranging the beam dump modules can be increased further by uniformizing all of the connecting flanges 501a of each of the frames 501.

For example, auxiliary devices, such as a vacuum pump, various control apparatuses, and various power source apparatuses, may be provided in the vicinity of the chamber 2. For this reason, it may be required for the beam dump apparatus 500 to be provided while avoiding interference with the auxiliary devices. In cases that there are limitations on the protrusive shape of the beam dump apparatus 500 from the chamber 2, the beam dump apparatus 500B can be easily installed on the chamber 2, by changing the arrangement of the beam dump modules as appropriate, as illustrated in the example of the second modification.

The other configurations, operations, and effects may be the same as those of the embodiments described above.

10. Sixth Embodiment

The beam dumper 104 of each module may be replaced with a laser beam measuring device, such as a power meter and a beam profiler in the beam dump apparatus 500 of the example described as the fifth embodiment. A sixth embodiment will be described as an example in which a power meter is employed instead of the beam dumper 104 of the final end module 540.

10.1 Configuration

Figure 25:
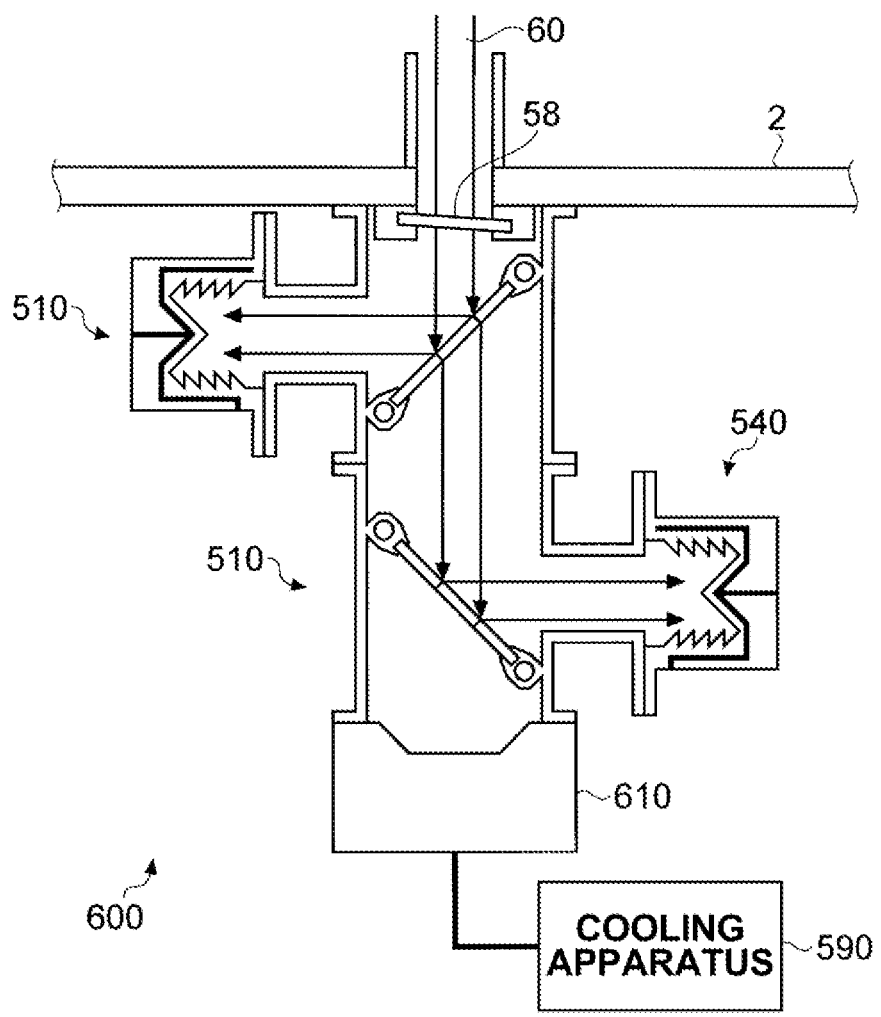
FIG. 25 is a diagram that schematically illustrates an example of the configuration of a beam dump apparatus according to a sixth embodiment.

FIG. 25 is a diagram that schematically illustrates an example of the configuration of a beam dump apparatus according to the sixth embodiment. As illustrated in FIG. 25, the beam dump apparatus 600 may be equipped with beam dump modules 510 and 520, and a power meter 610 as a final end module. The beam dump modules 510 and 520 may be the same as the beam dump modules 510 and 520 described above.

The power meter 610 may be connected to the laser control unit 41. In addition, the power meter 610 may be connected to the cooling apparatus 590.

10.2 Operation

The power meter 610 may measure the power of the laser beam 60 that enters thereinto. The power meter 610 may output the measured power of the laser beam 60 to the laser control unit 41.

The laser control unit 41 may store the reflectance of the beam splitter 102 of each of the beam dump modules 510 and 520. The laser control unit 41 may calculate the power reduction rate of the laser beam 60 that enters the power meter 610 with respect to the laser beam 60 which had entered the beam dump apparatus 600, based on the values of the reflectance of each of the beam splitters 102.

In addition, the laser control unit 41 may calculate the power of the laser beam 60 which had entered the beam dump apparatus 600 (referred to as incident power) from the energy of the laser beam 60 which is detected by the power meter 610, based on the calculated power reduction rate.

The calculated incident power of the laser beam 60 may be utilized as a parameter for various types of control which are exerted by the laser control unit 41. For example, the laser control unit 41 may operate the laser beam manipulator 53 based on the calculated incident power of the laser beam 60. Thereby, the irradiation state of the target 27 by the laser beam may be controlled.

10.3 Effects

The laser beam 33 may be emitted at a greater diameter than that of the target 27. For this reason, the laser beam 33 which has passed through the periphery of the target 27 may enter the beam dump apparatus 600. By measuring the power of this laser beam 33, the irradiation state of the target 27 by the laser beam 33 can be estimated. In addition, by operating the laser beam manipulator 53 based on the estimated irradiation state, the irradiation state of the target 27 by the laser beam 33 can be appropriately maintained.

The other configurations, operations, and effects may be the same as those of the embodiments described above.

10.4 Modification to the Sixth Embodiment

An example of a modification in which a beam profiler is employed instead of the beam dumper 104 in the final end module 540 will be described.

10.4.1 Configuration

Figure 26:
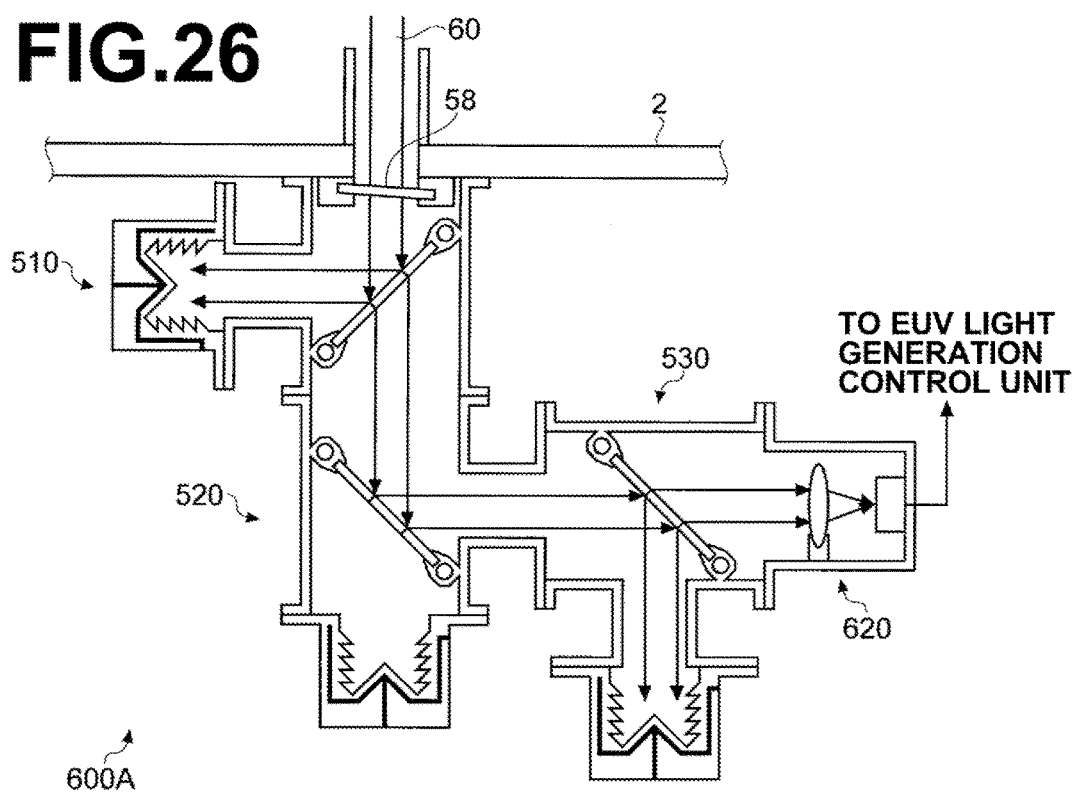
FIG. 26 is a diagram that schematically illustrates an example of the configuration of a modification to the beam dump apparatus according to the sixth embodiment.

FIG. 26 is a diagram that schematically illustrates an example of the configuration of a beam dump apparatus according to the modification. As illustrated in FIG. 26, the beam dump apparatus 600A may be equipped with beam dump modules 510~530, and a beam profiler 620 as a final end module. The beam dump modules 510~530 may be the same as the beam dump modules 510~530 described above. However, the arrangement of the beam dump modules 510~530 may be that which is bent in an L shape.

The laser beam 60 that enters the beam profiler 620 may be collected by a collecting optical system 621. The collecting optical system 621 may be designed to match the dumper mirror 57 (refer to FIG. 2) such that an image of the laser beam 33 in the vicinity of the plasma generating region 25 is transferred to a light receiving surface 622 of the beam profiler 620.

10.4.2 Operation

The beam profiler 620 may measure a cross sectional profile image of the laser beam 60 that enters thereinto. The cross sectional profile image may be a cross sectional profile image of the laser beam 33 by which the target 27 is irradiated within the plasma generating region 25.

Image data of the measured cross sectional profile image may be input to the EUV light generation control unit 5. The EUV light generation control unit 5 may utilize the image data as a parameter for various types of control. For example, the EUV light generation control unit 5 may judge the irradiation state of the target 27 by the laser beam 33 based on the image data.

Figure 27:
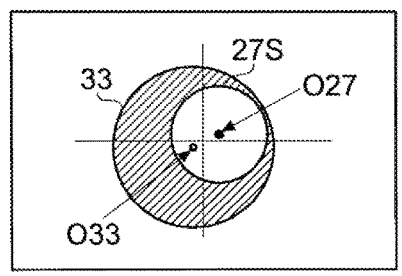
FIG. 27 is a diagram that illustrates an example of a cross sectional profile image of the sixth embodiment.

An example of a cross section profile image is illustrated in FIG. 27. The EUV light generation control unit 5 may judge whether the distance D between a center position O33 of the laser beam 33 and a center position O27 of a shadow 27S of the target 27 is within an allowable range, for example.

In the case that the distance D is not within the allowable range, the EUV light generation control unit 5 may operate the laser beam manipulator 53 such that the distance D becomes shorter. In addition, the EUV light generation control unit 5 may control the delay time from input of target detection signals to output of light emission triggers such that the distance D becomes shorter.

10.4.3 Effects

By adopting the configuration described above, the irradiation state of the target 27 by the laser beam 33 can be maintained appropriately, employing the laser beam 60, of which the power has been reduced.

The other configurations, operations, and effects may be the same as those of the embodiments described above.

The description above is intended to be illustrative and the present disclosure is not limited thereto. Therefore, it would be obvious to those skilled in the art that various modifications to the embodiments of the present disclosure would be possible as long as they do not stray from the spirit and the scope of the appended claims.

The terms which are employed in the present specification and the appended claims are to be interpreted as "not limiting". For example, the terms "include" and "including" are to be interpreted to mean "including the described elements but not limited thereto". The term "have" is to be interpreted to mean "having the described elements but not limited thereto". Further, the indefinite articles "a" and "an", as well as the word "one" in the present specification as well as the appended claims are to be interpreted to mean "at least one" or "one or more".

What is claimed is:

1. A beam dump apparatus, comprising:
   an attenuator module;
   a beam dump module; and
   a laser control unit configured to control the attenuator module and the beam dump module;
   the attenuator module including:
   a first beam splitter provided inclined with respect to the optical axis of a laser beam at a first angle;

a second beam splitter provided inclined with respect to the optical axis at a second angle, of which the absolute value is equal to that of the first angle and of which the sign is opposite to that of the first angle;

a first beam dumper provided such that the laser beam which is reflected by the first beam splitter enters thereinto;

a second beam dumper provided such that the laser beam which is reflected by the second beam splitter enters thereinto; and a first stage that translates the first and second beam splitters in a direction perpendicular to the optical axis to cause the first and second beam splitters to advance into and retreat from the optical path of the laser beam;

the beam dump module including:

a mirror provided inclined with respect to the optical axis of the laser beam;

a third beam dumper provided such that the laser beam which is reflected by the mirror enters thereinto; and a second stage that causes the mirror to advance into and retreat from the optical path;

the laser control unit controlling the first stage to selectively cause the first and second beam splitters to advance into or retreat from the optical path, and controlling the second stage to selectively cause the mirror to advance into or retreat from the optical path; and each of capacities of the first beam damper, second beam damper, and third beam dumper is smaller than laser output incident on the beam dump apparatus.

2. A beam dump apparatus as defined in claim 1, wherein:
the second stage translates the mirror in a direction perpendicular to the optical axis.

3. A beam dump apparatus as defined in claim 1, wherein:
the laser control unit exerts control to cause the mirror to retreat from the optical path in a state in which the first and second beam splitters are inserted in the optical path.

4. A beam dump apparatus as defined in claim 1, wherein:
the attenuator module further comprises:
a first rotatable stage, which is provided on the first stage, and on which the first beam splitter is mounted;
a second rotatable stage, which is provided on the first stage, and on which the first beam dumper is mounted;
a third rotatable stage, which is provided on the first stage, and on which the second beam splitter is mounted; and
a fourth rotatable stage, which is provided on the first stage, and on which the second beam dumper is mounted; and
the laser control unit controlling the rotation of the first through fourth rotatable stages, such that the second rotatable stage is rotated for a fourth angle which is double a third angle, the third rotatable stage is rotated for a fifth angle having the same absolute value as the third angle with an opposite sign, and the fourth rotatable stage is rotated for a sixth angle which is double the fifth angle, in the case that the first rotatable stage is rotated for the third angle.

5. A beam dump apparatus as defined in claim 1, further comprising:
a cooling mechanism configured to cool at least one of the first and second beam splitters, the mirror, and the first through third beam dumpers.

6. A laser apparatus, comprising:
a master oscillator configured to output a laser beam;
an amplifier configured to amplify the laser beam; and
a beam dump apparatus as defined in claim 5, provided along the optical path of the laser beam.

7. An extreme ultraviolet light generating apparatus configured to generate extreme ultraviolet light by a target substance, which is supplied into a plasma generating region, being irradiated by a laser beam, comprising:
a laser apparatus as defined in claim 6, which is configured to output the laser beam;
a chamber, within which the plasma generating region is set;
a light collecting optical system configured to collect the laser beam in the vicinity of the plasma generating region;
a target supply apparatus configured to supply the target substance in the vicinity of the plasma generating region; and
a light collecting mirror configured to collect extreme ultraviolet light emitted by plasma, which is generated by the target substance being irradiated by the laser beam.

8. The extreme ultraviolet light generating apparatus as defined in claim 7, further comprising:
a dumper mirror configured to reflect the laser beam which has passed through the plasma generating region; and
a fourth beam dump apparatus that is arranged such that the laser beam having been reflected by the dumper mirror is incident on the fourth beam dump apparatus.

9. The beam dump apparatus as defined in claim 1, wherein
the capacity of the third beam dumper is smaller than the capacity of the second beam dumper.

10. The beam dump apparatus as defined in claim 1, wherein
each of the first stage, the second stage, and the third stage includes a uniaxial stage, and
the uniaxial stage is constituted by a combination of a ball screw and a motor, or an extendable and retractable air cylinder.

11. The beam dump apparatus as defined in claim 1, wherein
each of the first beam splitter, the second beam splitter, and the third beam splitter is constituted by a substrate formed by zinc selenide or diamond, and
an antireflection film is coated on a surface of the substrate from which the laser beam is output.

12. The beam dump apparatus as defined in claim 1, wherein
each of the first beam damper, the second beam damper, and the third beam dumper includes a cone portion and a corrugated portion,
the cone portion is a conically shaped portion, and
the corrugated portion suppresses diffusion of the laser beam, which has been diffused by the cone portion, to an exterior of each of the first beam damper, the second beam damper, and the third beam dumper.

13. The beam dump apparatus as defined in claim 1, wherein
the mirror is a copper substrate on which a gold coating is administered, or a silicon substrate coated with a high reflectance multiple layer film.

14. The beam dump apparatus as defined in claim 1, wherein
the laser control unit performs control to cause the first beam splitter, the second beam splitter, and the mirror to advance into the optical path.

15. The beam dump apparatus as defined in claim 1, wherein
the laser control unit performs control to cause the first beam splitter, the second beam splitter, and the mirror to retreat from the optical path.

16. The beam dump apparatus as defined in claim 1, wherein
a plurality of the attenuator modules is provided, and
one of the plurality of the attenuator modules includes a power meter or a beam profiler instead of the first beam dumper or the second beam dumper, the beam profiler including a collecting optical system.

* * * * *